(12) United States Patent
Li et al.

(10) Patent No.: US 8,588,109 B2
(45) Date of Patent: Nov. 19, 2013

(54) INTEGRATED LAWFUL INTERCEPT FOR INTERNET PROTOCOL MULTIMEDIA SUBSYSTEM (IMS) OVER EVOLVED PACKET CORE (EPC)

(75) Inventors: Mingxing Li, San Jose, CA (US); Phillip Andrew Ritter, Danville, CA (US); Patricia Ruey-Jane Chang, San Ramon, CA (US); Imtiyaz Shaikh, Pleasant Hill, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 323 days.

(21) Appl. No.: 12/636,436

(22) Filed: Dec. 11, 2009

(65) Prior Publication Data

US 2011/0141947 A1   Jun. 16, 2011

(51) Int. Cl.
*H04L 12/16* (2006.01)
(52) U.S. Cl.
USPC .......................................... 370/259; 709/223

(58) Field of Classification Search
None
See application file for complete search history.

(56) References Cited

U.S. PATENT DOCUMENTS

| | | | |
|---|---|---|---|
| 2007/0243870 A1* | 10/2007 | Bantukul | 455/435.1 |
| 2010/0039946 A1* | 2/2010 | Imbimbo et al. | 370/252 |
| 2010/0135282 A1* | 6/2010 | Feng et al. | 370/352 |
| 2011/0128913 A1* | 6/2011 | Chowdhury et al. | 370/328 |

* cited by examiner

*Primary Examiner* — Andrew Lai
*Assistant Examiner* — Leon Andrews

(57) ABSTRACT

A system includes a device that receives a lawful intercept request from a law enforcement agency, and determines whether a packet data lawful intercept or a session initiation protocol (SIP)-based applications (SBA) lawful intercept is requested by the lawful intercept request. The device also provisions, when a packet data lawful intercept is requested by the lawful intercept request, a policy control and charging rules function (PCRF) and a packet data network (PDN) gateway (PGW) for the packet data lawful intercept. The device further provisions, when a SBA lawful intercept is requested, a proxy call session control function. (P-CSCF), a serving-CSCF (S-CSCF), and a session border controller (SBC) for the SBA lawful intercept.

24 Claims, 12 Drawing Sheets

US 8,588,109 B2

INTEGRATED LAWFUL INTERCEPT FOR INTERNET PROTOCOL MULTIMEDIA SUBSYSTEM (IMS) OVER EVOLVED PACKET CORE (EPC)

BACKGROUND

Internet protocol (IP) multimedia subsystem (IMS) over evolved packet core (EPC) is the next generation core network architecture to provide multimedia services across a variety of access technologies with seamless mobility. IMS enables multimedia services over IP networks. EPC is an all-IP packet-switched core network that supports high-speed wireless and wireline broadband access technologies. To deploy an IMS over EPC network, lawful intercept (LI) is a mandatory requirement in most countries. LI is the legally sanctioned official access to private communications, such as telephone calls or email messages. LI is a security process in which a network operator or service provider gives law enforcement officials access to the communications of private individuals or organizations. The design of LI has to enable both packet data intercept (i.e., all packets are intercepted) and per-session (e.g., session initiation protocol (SIP) based) multimedia application intercept.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that enable lawful intercept for IMS over EPC networks. In one exemplary implementation, the systems and/or methods may receive a lawful intercept request from a law enforcement agency, and may determine a type of lawful intercept from the request. When a packet data lawful intercept is requested, the systems and/or methods may provision a PCRF, which may subsequently provision a packet data network (PDN) gateway (PGW), for the packet data lawful intercept; may receive intercepted packet data from the PGW; may format the intercepted packet data; and may provide the formatted, intercepted packet data to the law enforcement agency. When a SIP-based applications (SBA) lawful intercept is requested, the systems and/or methods may provision a P-CSCF, a S-CSCF, and a session border controller (SBC)/media gateway (MGW) for the SBA lawful intercept; may receive intercept related information (IRI) from S-CSCF and call content (CC) from the SBC/MGW or PGW; may format the intercepted IRI and CC; and may provide the formatted, intercepted IRI and CC to the law enforcement agency.

Figure 1:
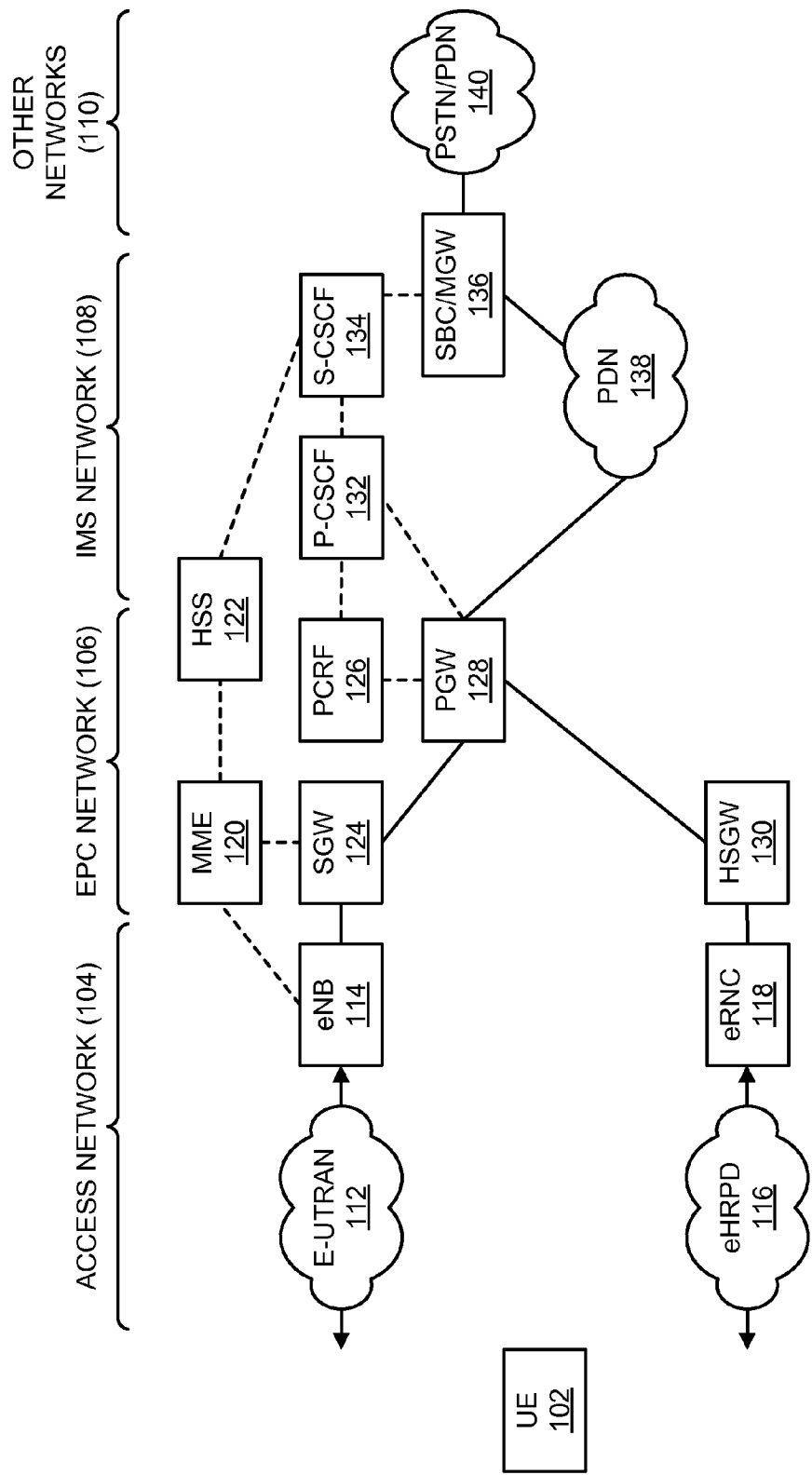
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include a user equipment (UE) 102, an access network 104, an EPC network 106, an IMS network 108, and other networks 110. Access network 104 may include an evolved universal terrestrial radio access network (E-UTRAN) 112, an eNodeB (eNB) 114, an enhanced high-rate packet data (eHRPD) network 116, and an evolved radio network controller (eRNC) 118. EPC network 106 may include a mobility management entity (MME) 120, a home subscriber server (HSS) 122, a serving gateway (SGW) 124, a PCRF 126, a PGW 128, and a HRPD serving gateway (HSGW) 130. IMS network 108 may include a P-CSCF 132, a S-CSCF 134, a SBC/MGW 136, and a PDN 138. Other networks 110 may include a Public Switched Telephone Network (PSTN)/PDN 140. Devices/networks of network 100 may interconnect via wired and/or wireless connections.

A single UE 102, access network 104, EPC network 106, IMS network 108, other networks 110, E-UTRAN 112, eNB 114, eHRPD network 116, eRNC 118, MME 120, HSS 122, SGW 124, PCRF 126, PGW 128, HSGW 130, P-CSCF 132, S-CSCF 134, SBC/MGW 136, PDN 138, and PSTN/PDN 140 have been illustrated in FIG. 1 for simplicity. In practice, there may be more UEs 102, access networks 104, EPC networks 106, IMS networks 108, other networks 110, E-UTRANs 112, eNBs 114, eHRPD networks 116, eRNCs 118, MMEs 120, HSSs 122, SGWs 124, PCRFs 126, PGWs 128, HSGWs 130, P-CSCFs 132, S-CSCFs 134, SBC/MGWs 136, PDNs 138, and/or PSTN/PDNs 140. Also, in some instances, one or more of the components of network 100 may perform one or more functions described as being performed by another one or more of the components of network 100. As further shown in FIG. 1, components of access network 104 may connect to components of EPC network 106, and components of EPC network 106 may connect to components of IMS network 108. Components of IMS network 108 may connect to PSTN/PDN 140 via SBC/MGW 136, and HSS 122 may be used by components of EPC network 106 and IMS network 108.

UE 102 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA)

(e.g., that can include a radiotelephone, a pager, Internet/intranet access, etc.), a laptop computer, a personal computer, a landline telephone, or other types of computation or communication devices. In an exemplary implementation, UE 102 may include a device that is capable of communicating over access network 104, EPC network 106, IMS network 108, and/or other networks 110.

Access network 104 may include a communications network that connects subscribers (e.g., UE 102) to a service provider. In one example, access network 104 may include a WiFi network or other access networks (e.g., in addition to E-UTRAN 112 and eHRPD network 116). EPC network 106 may include a core network architecture of the Third Generation Partnership Project's (3GPP) long term evolution (LTE) wireless communication standard. IMS network 108 may include an architectural framework or network (e.g., a telecommunications network) for delivering IP multimedia services. Other networks 110 may include one or more packet networks (e.g., a PSTN, a PDN, etc.) capable of communicating with UE 102.

E-UTRAN 112 may include a radio access network capable of supporting high data rate, low latency, packet optimization, large capacity and coverage, etc.

eNB 114 may include one or more computation and/or communication devices that receive voice and/or data from MME 120 and/or SGW 124 and transmit that voice and/or data to UE 102. eNB 114 may also include one or more devices that receive voice and/or data from UE 102 and transmit that voice and/or data to one of MME 120 and/or SGW 124 or to other UEs 102.

eHRPD network 116 may include a radio access network that permits a code division multiple access (CDMA)-based UE 102 to upgrade its existing packet core network using elements of EPC network 106.

eRNC 118 may include one or more computation and/or communication devices that receive voice and/or data from HSGW 130 and transmit that voice and/or data to UE 102. eRNC 118 may also include one or more devices that receive voice and/or data from UE 102 and transmit that voice and/or data to HSGW 130 or to other UEs 102.

MME 120 may include one or more computation and/or communication devices that may be responsible for an idle mode tracking and paging procedures (e.g., including retransmissions) for UE 102. MME 120 may be involved in a bearer activation/deactivation process (e.g., for UE 102) and may choose a SGW for UE 102 at an initial attach and at a time of intra-LTE handover. MME 120 may authenticate UE 102 (e.g., via interaction with HSS 122). Non-access stratum (NAS) signaling may terminate at MME 120 and MME 120 may generate and allocate temporary identities to UEs (e.g., UE 102). MME 120 may check authorization of UE 102 to camp on a service provider's Public Land Mobile Network (PLMN) and may enforce roaming restrictions for UE 102. MME 120 may be a termination point in EPC network 106 for ciphering/integrity protection for NAS signaling and may handle security key management. MME 120 may provide a control plane function for mobility between LTE and access networks with a S3 interface terminating at MME 120. MME 120 may also terminate a S6a interface towards HSS 122 for roaming UEs.

HSS 122 may include one or more computation or communication devices that gather, process, search, and/or provide information in a manner described herein. In one exemplary implementation, HSS 122 may include a master user database that supports devices of IMS network 108 that handle calls. HSS 122 may contain subscription-related information (e.g., subscriber profiles), may perform authentication and authorization of a user, and may provide information about a subscriber's location and IP information.

SGW 124 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one exemplary implementation, SGW 124 may route and forward user data packets, may act as a mobility anchor for a user plane during inter-eNB handovers, and may act as an anchor for mobility between LTE and other 3GPP technologies. For idle state UEs, SGW 124 may terminate a downlink (DL) data path and may trigger paging when DL data arrives for UE 102. SGW 124 may manage and store contexts associated with UE 102 (e.g., parameters of an IP bearer service, network internal routing information, etc.).

PCRF 126 may include one or more computation or communication devices that may provide policy control decision and flow based charging control functionalities. PCRF 126 may provide network control regarding service data flow detection, gating, quality of service (QoS) and flow based charging, etc. PCRF 126 may determine how a certain service data flow shall be treated, and may ensure that user plane traffic mapping and treatment is in accordance with a user's subscription profile. PCRF 126 may interface with PGW 128 over a Gx interface, and may interface with P-CSCF 126 over a Rx interface.

PGW 128 may include one or more data transfer devices (or network devices), such as a gateway, a router, a switch, a firewall, a NIC, a hub, a bridge, a proxy server, an OADM, or some other type of device that processes and/or transfers data. In one exemplary implementation, PGW 128 may provide connectivity of UE 102 to external packet data networks (e.g., to PDN 138) by being a traffic exit/entry point for UE 102. UE 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies.

HSGW 130 may include one or more data transfer devices (or network devices), such as a gateway, a router, a switch, a firewall, a NIC, a hub, a bridge, a proxy server, an OADM, or some other type of device that processes and/or transfers data. In one exemplary implementation, HSGW 130 may perform functions similar to the functions described above for SGW 124 (e.g., but for eHRPD network 116 instead of E-UTRAN 112).

P-CSCF 132 may include one or more computation or communication devices that gather, process, search, and/or provide information in a manner described herein. In an exemplary implementation, P-CSCF 132 may function as a proxy server for UE 102, where SIP signaling traffic to and from UE 102 may travel through P-CSCF 132. P-CSCF 132 may validate and then forward requests from UE 102, and may process and forward responses to UE 102.

S-CSCF 134 may include one or more computation or communication devices that gather, process, search, and/or provide information in a manner described herein. In one exemplary implementation, S-CSCF 134 may include a central node of a signaling plane. S-CSCF 134 may include a SIP server, but may perform session control too. S-CSCF 134 may handle SIP registrations, which allows S-CSCF 134 to bind the user location (e.g., the IP address of a UE) and a SIP address. S-CSCF 134 may inspect signaling messages, may decide to which application server(s) the SIP message will be forwarded, may provide routing services, may enforce a policy of a network operator, etc.

SBC/MGW 136 may include one or more data transfer devices (or network devices), such as a gateway, a router, a switch, a firewall, a NIC, a hub, a bridge, a proxy server, an OADM, or some other type of device that processes and/or transfers data. In one exemplary implementation, SBC/MGW 136 may provide control over signaling and media streams involved in setting up, conducting, and tearing down telephone calls or other interactive media communications. SBC/MGW 136 may be a point of demarcation between IMS network 108 and other networks 110.

PDN 138 may include a network that provides data services (e.g., via packets), such as the Internet, an intranet, an asynchronous transfer mode (ATM) network, etc.

PSTN/PDN 140 may include a network of the world's public circuit-switched telephone networks. PSTN/PDN 140 may include fixed-line analog telephone systems, digital telephone systems, and mobile and fixed telephones. PSTN/PDN 140 may also include a network that provides data services (e.g., via packets), such as the Internet, an intranet, an ATM network, etc.

Although FIG. 1 shows exemplary devices/networks of network 100, in other implementations, network 100 may contain fewer, different, differently arranged, or additional device/networks than depicted in FIG. 1.

Figure 2:
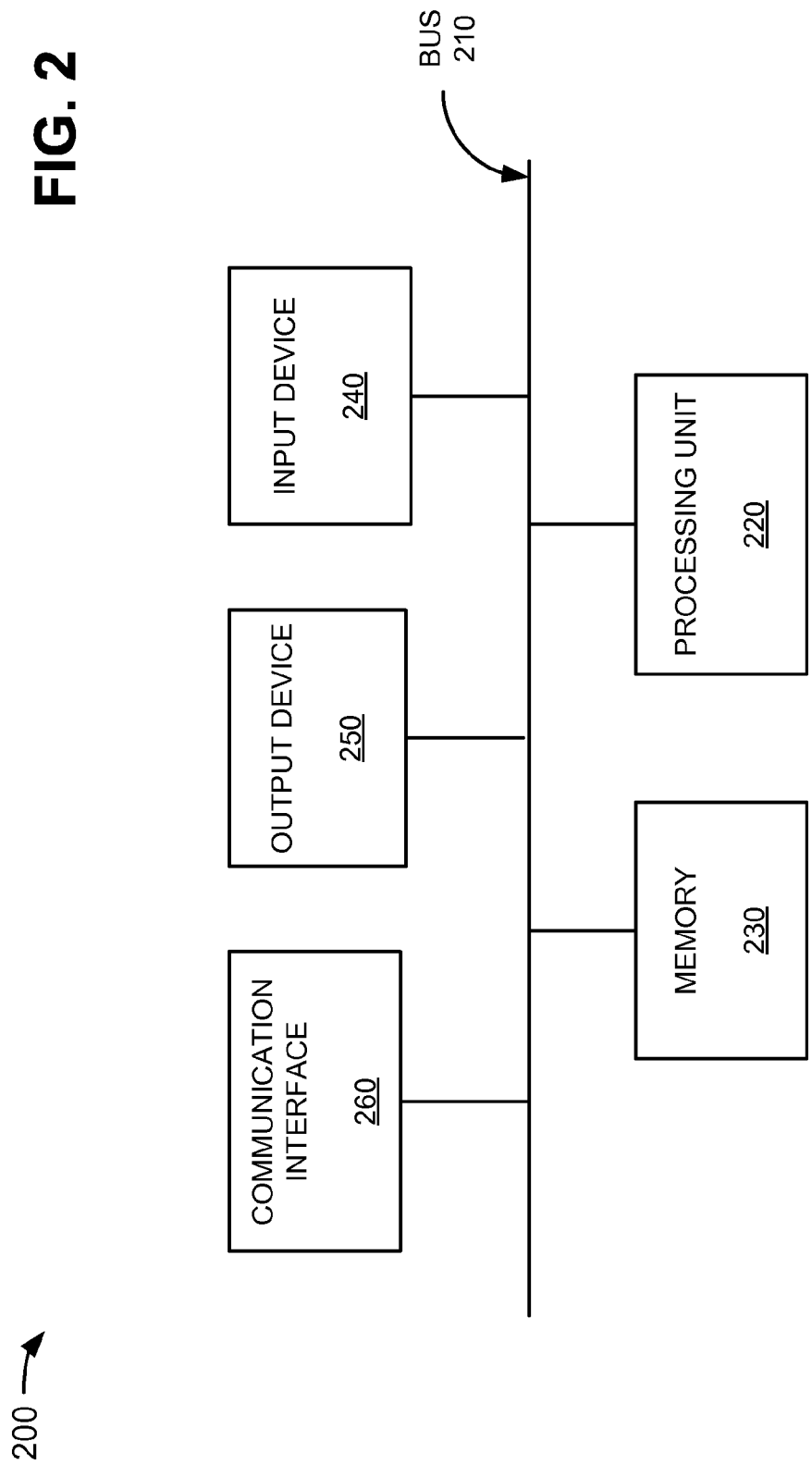
FIG. 2 is a diagram of exemplary components of a device that may correspond to one of the devices of the network depicted in FIG. 1.

FIG. 2 is a diagram of exemplary components of a device 200 that may correspond to one of the devices of network 100. One or more of the devices depicted in FIGS. 3-8 (and described below) may contain comparable configurations. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. Alternatively, or additionally, one or more components of device 200 may perform one or more other tasks described as being performed by one or more other components of device 200.

To deploy IMS over EPC commercially, lawful intercept (LI) is a mandatory requirement in many countries. A service provider must be able to intercept SIP-based IMS multimedia calls (e.g., voice-over-IP (VoIP) calls) and non-SIP based packet data traffic (e.g., web browsing) associated with an intercept subject (e.g., UE 102). For SIP-based multimedia calls, a lawful intercept standard has been defined by The Alliance for Telecommunication Industry Solutions (ATIS). In the standard, intercept access points (IAPB) have been suggested for both call identifying information (e.g., intercept related information (IRI)) and call content (CC). However, the ATIS standard fails to define how to locate a correct CC IAP from multiple CC IAPB, and how to instruct a CC IAP, in real-time, on how to intercept each VoIP real-time transport protocol (RTP) session associated with an intercept subject. The ATIS standard further fails to define how to intercept non-SIP based packet data traffic associated with an intercept subject.

The PacketCable 2.0 standard defines a lawful intercept architecture for IMS in a cable network environment. In this architecture, all CSCFs are defined as IRI IAPB. The CSCFs provide copies of SIP messages to a lawful intercept delivery function (DF). The DF checks session description protocol (SDP) fields carried by the SIP messages to find an IP address of an intercept subject. With the IP address of intercept subject, the DF then needs to determine from which CC IAP to intercept call media (e.g., RTP voice packets). To determine a correct CC IAP, the PacketCable standard defines a control point discovery (CPD) protocol.

Using the CPD protocol, the DF sends a CPD message toward the intercept subject. A destination IP address of the CPD message is the IP address of the intercept subject. A media control point in the path between the DF and the intercept subject recognizes the CPD message and responds back (e.g., via a CPD response message) with an IP address of the media control point. The media control point then becomes the CC IAP. Once the DF receives the CPD response message, the DF knows the IP address of the identified CC IAP (e.g., the media control point), and sends a media intercept request message to the CC IAP. The media request message includes a request that the CC IAP make copies of the RTP packets (e.g., that have the intercept subject's IP address) and send the copied RTP packets to the DF. The DF, in turn, forwards the IRI and CC to a law enforcement agency (LEA) that requested the intercept.

However, the PacketCable standard fails specify how to intercept non-SIP based packet data. Furthermore, the PacketCable standard requires all potential CC IAPB and the DF to implement the CPD protocol, and to implement interfaces between the DF and the CC IAPB for provisioning the intercept. Each potential CC IAP must detect CPD messages and remove them to ensure that those CPD messages will not reach the intercept subject. In addition to the CPD protocol, the PacketCable standard also requires border routers and application servers (AS) (e.g., voice mail servers and media servers) to be CC IAPB.

Figure 3:
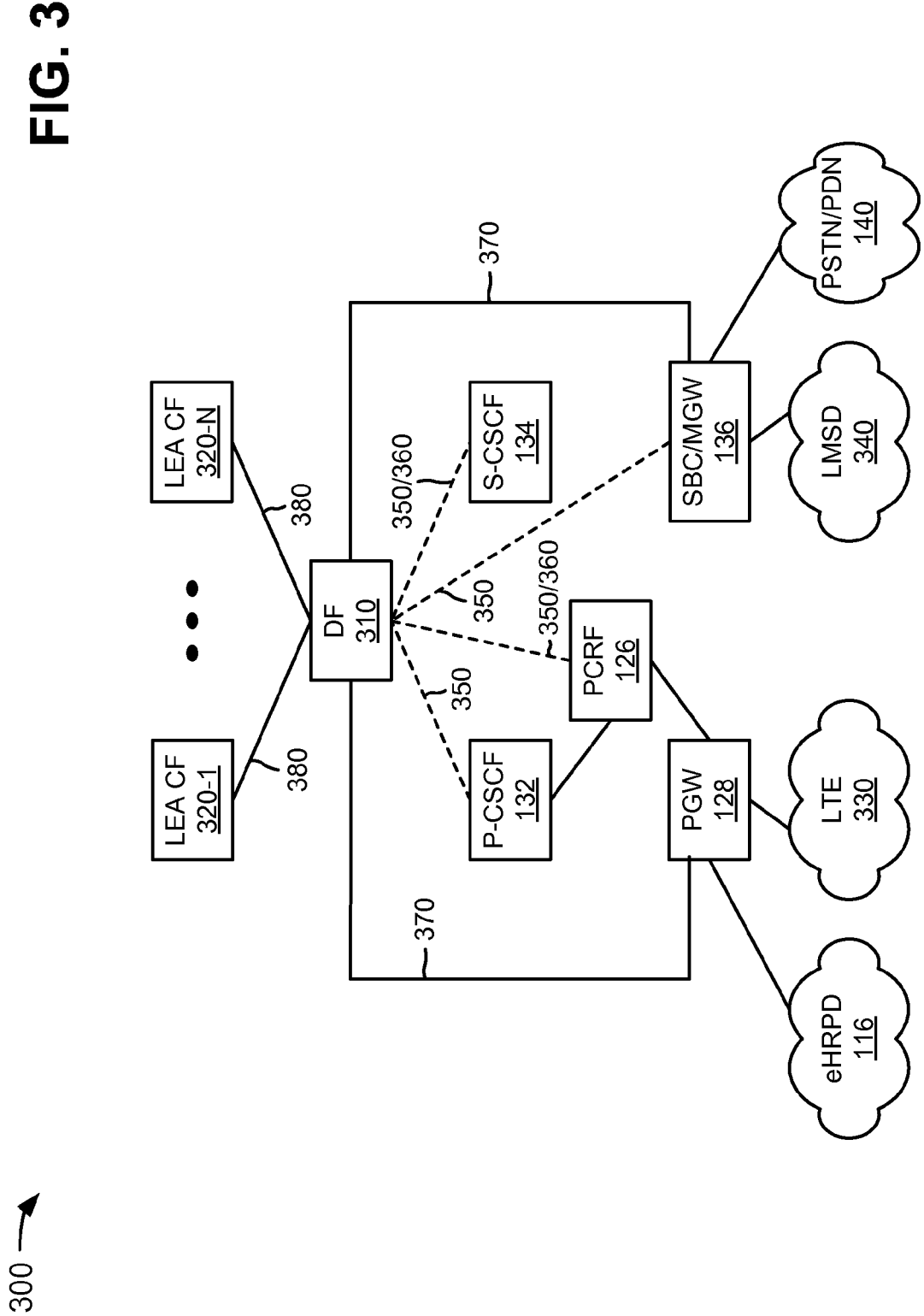
FIG. 3 is a diagram of exemplary interactions among components of an exemplary portion of the network depicted in FIG. 1.

In contrast to the ATIS standard and the PacketCable standard, systems and/or methods described herein may intercept both SIP based multimedia sessions as well as non-SIP based packet data sessions by dynamically finding a correct CC IAP for CC intercept. FIG. 3 is a diagram of exemplary interactions among components of an exemplary portion 300 of network 100. Exemplary network portion 300 may intercept both SIP based multimedia sessions as well as non-SIP based packet data sessions by dynamically finding a correct CC IAP for CC intercept.

As illustrated in FIG. 3, exemplary network portion 300 may include eHRPD network 116, PCRF 126, PGW 128, P-CSCF 132, S-CSCF 134, SBC/MGW 136, PSTN/PDN 140, a deliver function (DF) 310, a group of law enforcement agency (LEA) collection functions (CFs) 320-1 through 320-N (referred to collectively as "LEA CFs 320", and in some instances individually, as "LEA CF 320"), a LTE network 330, and a legacy mobile station domain (LMSD) network 340. eHRPD network 116, PCRF 126, PGW 128, P-CSCF 132, S-CSCF 134, SBC/MGW 136, and PSTN/PDN 140 may include the features described above in connection with, for example, FIGS. 1 and 2.

In general, a lawful intercept request may be for voice, multimedia, packet data, or all three. For either voice or packet data intercept, the request may be for IRI only or for IRI and CC. If the request is for IRI, then only signaling messages may need to be intercepted and reported to a LEA. If the request is for IRI and CC, then both signaling messages and bearer content packets may need to be reported to the LEA. For SIP-based applications (SBA) intercept, the IRI messages may include SIP messages and the CC may include RTP packets. For packet data intercept, the IRI may include session related activities (e.g., session establishment and session tear-down) and the CC may include bearer data packets of a subject session.

DF 310 may include one or more computation or communication devices that gather, process, search, and/or provide information in a manner described herein. In an exemplary implementation, DF 310 may receive a lawful intercept (LI) request from one of LEA CFs 320 (e.g., LEA CF 320-1), and may determine a type of LI from the LI request. When a packet data LI is requested, DF 310 may provision PCRF 126, which subsequently provisions PGW 128 serving the intercept subject, for the packet data LI; may receive intercepted packet data from PGW 128; may format the intercepted packet data; and may provide the formatted, intercepted packet data to LEA CF 320-1. When a SBA LI is requested, DF 310 may provision P-CSCF 132, S-CSCF 134, and SBC/MGW 136 for the SBA LI; may receive intercepted SBA from PGW 128 and/or SBC/MGW 136 serving the intercept subject; may format the intercepted SBA; and may provide the formatted, intercepted SBA to LEA CD 320-1.

LEA CF 320 may include one or more computation or communication devices that gather, process, search, and/or provide information in a manner described herein. In an exemplary implementation, LEA CF 320 may request and receive intercepted IRI and CC. LEA CF 320 may interface DF 310 via a handover interface (HI) (e.g., using a TIA-1066 protocol for CDMA wireless access, a TS33.108 protocol for LTE wireless access, a T1-678 protocol for wireline access, or other interface protocols).

LTE network 330 may include an access network capable of providing peak data rates of one hundred (100) megabits per second (Mbps) downstream and thirty (30) Mbps upstream, reduced latency, scalable bandwidth capacity, and backwards compatibility. LMSD network 340 may include a network that supports circuit mode IP transport call delivery.

As further shown in FIG. 3, X1 interfaces 350 may be provided between DF 310 and P-CSCF 132 and between DF 310 and SBC/MGW 136; X1 interfaces 350 and X2 interfaces 360 may be provided between DF 310 and PCRF 126 and between DF 310 and S-CSCF 134; X3 interfaces 370 may be provided between DF 310 and PGW 128 and between DF 310 and SBC/MGW 136; and handover interfaces 380 may be provided between DF 310 and LEA CFs 320.

In an exemplary implementation, DF 310 may perform a LI administration function. In this function, based on a type of intercept (e.g., a SIP based LI or a packet based LI), DF 310 may propagate intercept subject identifiers (IDs) into appropriate network elements (e.g., via X1 interfaces 350) for performing the intercept. In one example, DF 310 may provision packet data subject IDs into PCRF 126 and may provision SBA intercept subject IDs into P-CSCF 132, S-CSCF 134, and SBC/MGW 136. DF 310 may also perform a mediation function between network elements, such as between IRI IAPB and LEA CF 320 and between CC IAPB and LEA CF 320. Intercepted IRI and CC may be provided by the IAPB back to DF 310. DF 310 may format the intercepted IRI and CC and may provide the formatted, intercepted IRI and CC to LEA CFs 320.

In the arrangement depicted in FIG. 3, S-CSCF 134 may be a IRI IAP for SBA intercepts, and may be a repository for SBA IRI intercept IDs. S-CSCF 134 may receive the SBA IRI intercept IDs from DF 310 (e.g., via X1 interface 350), and may store the SBA IRI intercept IDs. S-CSCF 134 may be assigned to serve an intercept subject, and may provide the IRI to DF 310 (e.g., via X2 interface 360). For a terminated call, S-CSCF 134 may check a SIP request Uniform Resource Identifier (URI or R-URI) header in a SIP invite message associated with the terminated call. If the terminated call is initiated by an application server (not shown), S-CSCF 134 may check a "P-Called-Party-ID" header provided in the SIP invite message. If any of the headers of the SIP invite message contain a subject ID (e.g., that matches one of SBA IRI intercept IDs stored in S-CSCF 134), S-CSCF 134 may report all SIP messages to DF 310. For an originated call, S-CSCF 134 may check for a subject ID in a "P-Asserted-ID" header and a "From" header of the SIP invite message. If any of the headers of the SIP invite message contain a subject ID (e.g., that matches one of SBA IRI intercept IDs stored in S-CSCF 134), S-CSCF 134 may report all SIP messages to DF 310. S-CSCF 134 may also update a "P-LI-Info" header that may be inserted in the SIP invite message by an originating S-CSCF 134. The "P-LI-Info" header may include instructions to pass a LI X2 and X3 correlation ID and to record involved parities when a call redirection occurs.

The originating S-CSCF 134 may generate a LI X2 and X3 correlation ID for every new dialog and may insert a "P-LI-Info" header in the SIP invite message before sending the SIP invite message to a next S-CSCF 134. The "P-LI-Info" header may include a correlation ID and involved party information. The involved party information may be used by S-CSCF 134 to record the involved parties (e.g., in a call redirection).

In the arrangement shown in FIG. 3, P-CSCF 132 may be a repository of SBA CC intercept subject IDs. P-CSCF 132 may receive SBA CC intercept IDs from DF 310 (e.g., via X1 interface 350), and may store the SBA CC intercept IDs. P-CSCF 132 may make a CC intercept determination by checking P-involved-parties in a "P-LI-Info" header associated with a SIP "183/200 OK" response message.

If any of the headers of the SIP response message contain a SBA subject ID (e.g., that matches one of SBA CC intercept IDs stored in P-CSCF 132), P-CSCF 132 may determine that the CC of a session needs to be intercepted. P-CSCF 132 may trigger a CC intercept at PGW 128, via a "LI-Indicator-Rx" Attribute Value Pair (AVP) included in a Rx Diameter authentication authorization request (AAR) message provided to PCRF 126. In addition to the "LI-Indicator-Rx" AVP, P-CSCF 132 may also provide a "LI-TargetDFAddr" AVP (e.g., in the AAR message) that indicates where to send intercepted CC packets. Exemplary formats of the "LI-Indicator-Rx" AVP and the "LI-TargetDFAddr" AVP may include the following:

| | |
|---|---|
| LI-Indicator-Rx ::=<AVP Header> | Grouped |
| { Random-Vector AVP } | Octet string |
| { Interception_Action AVP } | Integer32 |
| { LI_CorrelationID AVP } | Octet string (8 Octets) |
| * { LI_TargetDFAddress AVP } | |
| LI-TargetDFAddr ::=<AVP Header> | Grouped |
| { LI_TargetID AVP } | Octet string (4 Octets) |
| { DF_Address AVP } | Address |
| { DF_port AVP } | Integer16; | where a "Random-Vector AVP" may be required to support AVP hiding; an "Interception_Action AVP" may include three possible values (e.g., Add-Intercept=0, Remove-Intercept=1, and Dummy-Intercept=2); a "LI_CorrelationID AVP" may contain a correlation ID generated by PCRF 126 to correlate a X3 stream with a X2 stream (e.g., only one correlation ID may be required per session); a "Charging-Rule-Name AVP" may be an optional AVP that points to policy control and charging (PCC) rules present in a Gx message that form a LI filter (if this AVP is not present, all the PCC rules in the Gx message may apply to the LI filter); a "LI-TargetDFAddress Grouped AVP" may be provided in multiple instances depending on a number of LI subjects involved in a session; a "DF_Address AVP" may include an address of DF 310; and a "DF_Port AVP" may include a port number of DF 310.

The aforementioned exemplary AVPs may be included in Rx AAR messages by P-CSCF 132 if a session is a LI subject. The exemplary AVPs may also be randomly included to avoid detection if a session is not a LI subject session, and may be encrypted (or hidden) using a shared secret (e.g., except the "Random-Vector AVP").

In exemplary network portion 300, PCRF 126 may play a role in both packet data intercept and SBA intercept. For packet data intercept, PCRF 126 may be a repository for packet data intercept subject IDs. DF 310 may provide packet data intercept subject IDs (e.g., via X1 interface 350) to PCRF 126, and PCRF 126 may store the packet data intercept subject IDs. PCRF 126 may also be an IRI IAP for packet data intercept. PCRF 126 may provide an intercept subject's IRI to DF 310 via X2 interface 360. PCRF 126 may locate a correct PGW (e.g., PGW 128) for CC intercept for both SBA intercept and packet data intercept. For SBA intercept, PCRF 126 may locate a correct PGW via a Rx to Gx session binding process. Lawful intercept may piggyback on this function of PCRF 126 in order locate a correct PGW to intercept SBA applications. For packet data intercept, PCRF 126 may locate a correct PGW by comparing a provisioned subject ID with existing Gx session state information (e.g., stored in PCRF 126).

Once PCRF 126 identifies a Gx session for either SBA intercept or packet data intercept, PCRF 126 may issue a Diameter Re-Auth-Request (RAR) message. The RAR message may include a "LI-Indicator-Gx Grouped" AVP and a "LI-TargetDFAddr Group" AVP. The "LI-Indicator-Gx Grouped" AVP and the "LI-TargetDFAddr Group" AVP may instruct PGW 128 to perform a CC intercept and may provide PGW 128 information on where to send the intercepted CC. Exemplary formats of the "LI-Indicator-Gx Grouped" AVP and the "LI-TargetDFAddr Group" AVP may include the following:

| | |
|---|---|
| LI-Indicator-Gx ::=<AVP Header> | Grouped |
| { Random-Vector AVP } | Octet string |
| { Interception_Action AVP } | Integer32 |
| { LI_CorrelationID AVP } | Octet string (8 Octets) |
| * { LI_TargetDFAddress AVP } | |
| * [Charging-Rule-Name] | Octet string |
| LI-TargetDFAddr ::=<AVP Header> | Grouped |
| { LI_TargetID AVP } | Octet string (4 Octets) |
| { DF_Address AVP } | Address |
| { DF_port AVP } | Integer16; | where a "Random-Vector AVP" may be required to support AVP hiding; a "Interception_Action AVP" may include three possible values (e.g., Add-Intercept=0, Remove-Intercept=1, and Dummy-Intercept=2); a "LI_CorrelationID AVP" may contain a correlation ID generated by PCRF 126 to correlate a X3 stream with a X2 stream (e.g., only one correlation ID may be required per session); a "Charging-Rule-Name AVP" may be an optional AVP which points to PCC rules present in a Gx message that form the LI filter (if this AVP is not present, all the PCC rules in the Gx message may apply to the LI filter); a "LI-TargetDFAddress Grouped AVP" may be provided in multiple instances depending on a number of LI subjects involved in a session; a "DF_Address AVP" may include an Address of DF 310; and a "DF_Port AVP" may include a port number of DF 310.

The aforementioned exemplary AVPs may be included in Gx messages by PCRF 126 if a session is a LI subject. The exemplary AVPs may also be randomly included to avoid detection if a session is not a LI subject session, and may be encrypted (or hidden) using a shared secret (e.g., except the "Random-Vector AVP").

For SBA intercept, PCRF 126 may create a "LI-Indicator-Gx" AVP from the "LI-Indicator-Rx" AVP and the "LI-TargetDFAddr" AVP received from the AAR message. PCRF 126 may add a "Charging-Rule-Name" AVP into the "LI-Indicator-Gx Grouped" AVP to indicate the PCC rules that PGW 128 should intercept. PCRF 126 may identify the PCC rules in the RAR message provided to PGW 128 or may identify a subset of the included PCC rules in the RAR message. For packet data intercept, PGW 128 may need to intercept packets from an IP-connectivity access network (IP-CAN) session. One way to convey the need to intercept such packets (e.g., to PGW 128) may include not providing the "Charging-Rule-Name" in the "LI-Indicator-Gx Group" AVP.

To intercept traffic from UE 102 (e.g., not yet attached to an access network), PCRF 126 may examine a Diameter Credit-Control-Request (CCR) message used for IP-CAN session establishment. If PCRF 126 finds a match between a subscriber ID included in a CCR message and an intercept subject ID, PCRF 126 may include the "LI-Indicator-Gx" AVP and the "LI-TargetDFAddr" AVP in the CCR message provided to PGW 128. Similarly, PCRF 126 may randomly include these AVPs to avoid detection if a session is not a LI subject session, and may encrypt (or hide) these AVPs using a shared secret.

In exemplary network portion 300, PGW 128 may be a CC IAP for packet data intercept and a main CC IAP for SBA intercept. PGW 128 may perform a CC intercept, may stop CC intercept, or may do nothing depending on a setting of an "Interception_action" AVP provided in the "LI-Indicator-Gx Grouped" AVP received from PCRF 126. If intercept is required, PGW 128 may intercept all packets of an IP-CAN session if no "Charging-Rule-Name" AVP is included in the "LI-Indicator-Gx" AVP, or may intercept only the PCC rules identified by the "Charging-Rule-Name" AVP in the "LI-Indicator-Gx" AVP. PGW 128 may use X3 interface 370 (e.g., provided between DF 310 and PGW 128) to send intercepted CC to DF 310 (e.g., as provided in the "LI-TargetDFAddr" AVP).

In exemplary network portion 300, SBC/MGW 136 may be an additional CC IAP for SBA intercept. X1 interface 350 (e.g., provided between DF 310 and SBC/MGW 136) may be used for SBA intercept subject ID provisioning. SBC/MGW 136 may deliver intercepted CC to DF 310 via X3 interface 370 (e.g., provided between DF 310 and SBC/MGW 136). SBC/MGW 136 may intercept SBA application traffic not traveling through PGW 128. One example of such a scenario is when an intercept associate calls an intercept subject that is homed on IMS network 108 over EPC network 106. The intercept subject may redirect the call to another associate located on PSTN/PDN 140 or to a voice mail account. In either scenario, bearer traffic may travel through MGW/SBC 136 but may not travel through PGW 128. Making SBC/MGW 136 another CC IAP may enable intercept of calls not traveling through PGW 128. In either scenario, IRI may continue to be provided by a S-CSCF 134 of the intercept subject because all signaling messages may continue to travel through S-CSCF 134.

For SBA application intercept, subject IDs may be provisioned into P-CSCF 132, S-CSCF 134, and SBC/MGW 136 via X1 interfaces 350 provided between DF 310 and P-CSCF 132, S-CSCF 134, and SBC/MGW 136. For each intercept subject contained in P-CSCF 132, there may be an indication regarding the type of intercept (e.g., an indication of whether CC intercept is required).

In an exemplary implementation, DF 310 may include a subject administration function and an IRI delivery function. Alternatively, or additionally, the subject administration function and the IRI delivery function may be provided on two separate devices. Subject IDs may be provisioned in DF 310 by authorized lawful intercept personnel (e.g., associated with LEA CFs 320). For intercept of SIP-based applications, such as VoIP, a subject ID may be in the form of a SIP URI and/or a tel URI. To support intercept of a particular subject (e.g., using any ID associated with the particular subject), all IDs associated with the particular subject may be provisioned in DF 310. When DF 310 receives an intercept request, DF 310 may check a type of intercept provided by the request. If the requested intercept is for SBA IRI only, DF 310 may propagate the intercept request to all S-CSCFs (e.g., S-CSCF 134) via X1 interface 350 (e.g., provided between S-CSCF 134 and DF 310). If the requested intercept is for both SBA IRI and CC, in addition to S-CSCF 134 and SBC/MGW 136, DF 310 may provision the CC intercept request to all P-CSCFs (e.g., P-CSCF 132) via X1 interface 350 (e.g., provided between DF 310 and P-CSCF 132). With such an arrangement, each S-CSCF may maintain a complete list of SIP-based application intercept subject IDs, and each P-CSCF may maintain a complete list of SIP-based application CC intercept subject IDs.

For intercept of packet data, a subject ID may be in the form of an International Mobile Subscriber Identity (IMSI) and/or a Network Access Identifier (NAI). When DF 310 receives a packet data intercept request, DF 310 may provision packet data intercept subject IDs to all PCRFs (e.g., PCRF 126) via X1 interface 350 (e.g., provided between DF 310 and PCRF 126). As a result, each PCRF may have a complete list of packet data intercept subject IDs.

Although FIG. 3 shows exemplary components of network portion 300, in other implementations, network portion 300 may contain fewer, different, differently arranged, or additional components than depicted in FIG. 3. Additionally, or alternatively, one or more components of network portion 300 may perform one or more other tasks described as being performed by one or more other components of network portion 300. In one example, MME 120 and/or HSS 122 (not shown in FIG. 3) may also be designated as IRI IAPB. Whether MME 120 and/or HSS 122 are designated as IRI IAPB may depend on whether S-CSCF 134 alone is able to provide all of the information required by LEA CFs 320.

Figure 4:
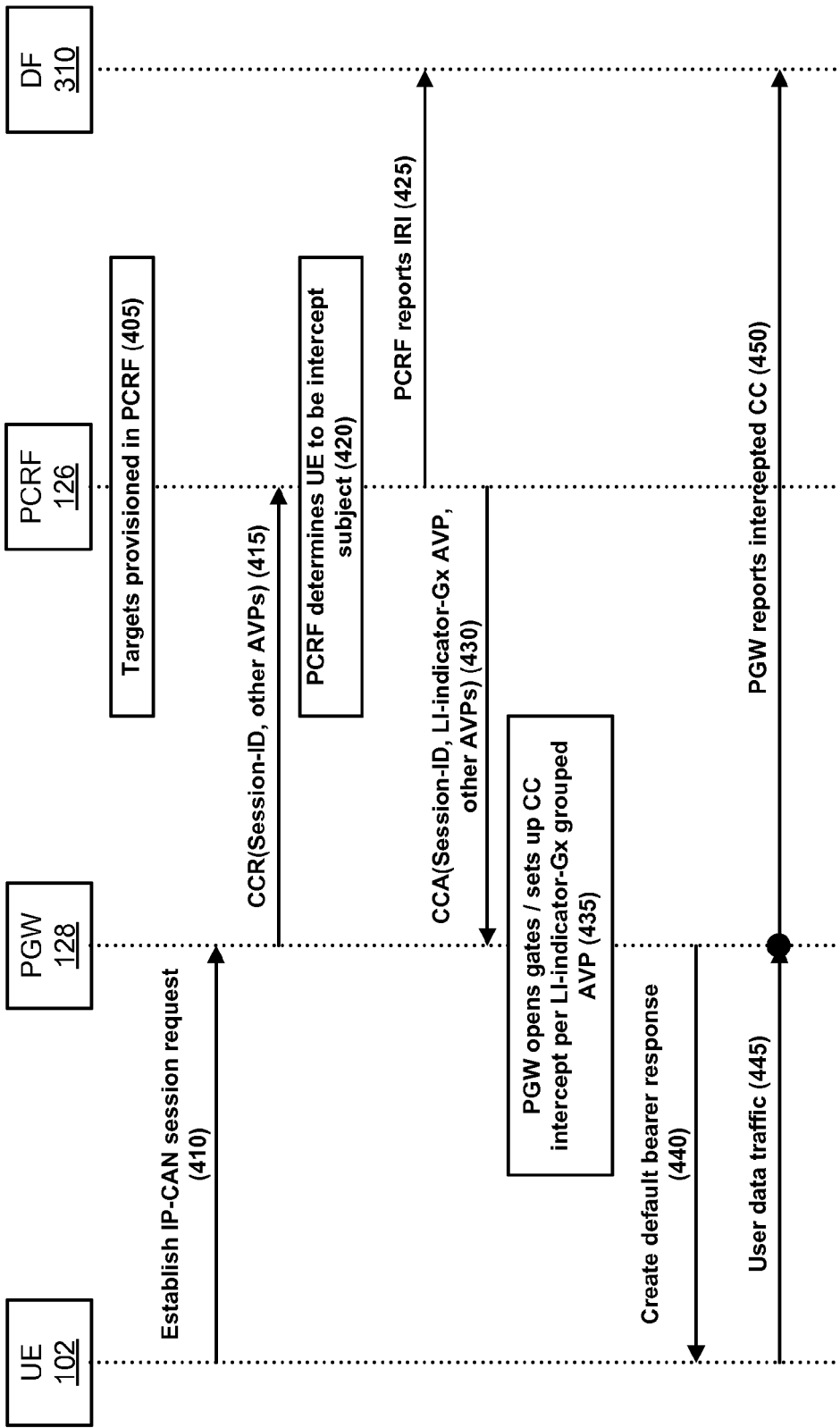
FIG. 4 is a diagram of an exemplary packet data lawful intercept in an exemplary portion of the network depicted in FIG. 1 and assuming that a user equipment is not yet attached to the network.

In an exemplary implementation, for packet data intercept, IRI may be provided by PCRF 126. PCRF 126 may report all session-related information of an intercept subject, and PGW 128 may report packet data content. FIG. 4 is a diagram of an exemplary packet data lawful intercept in an exemplary portion 400 of network 100 and assuming that UE 102 is not yet attached to network portion 400. As shown, exemplary network portion 400 may include UE 102, PCRF 126, PGW 128, and DF 310. UE 102 may include the features described above in connection with, for example, FIGS. 1 and 2. PCRF 126 and PGW 128 may include the features described above in connection with, for example, FIGS. 1-3. DF 310 may include the features described above in connection with, for example, FIG. 3.

As further shown in FIG. 4, targets (e.g., intercept subjects, such as UE 102) may be provisioned in PCRF 126, as indicated by reference number 405. If UE 102 attaches to EPC network 106, PGW 128 may receive an establish IP-CAN session request from UE 102, as indicated by reference number 410. PGW 128 may setup a Diameter session with PCRF 126 by providing a Diameter CCR message (e.g., requesting policy information) to PCRF 126, as indicated by reference number 415. Based on the CCR message, PCRF 126 may determine PCC rules required for the session and may determine that UE 102 is an intercept subject, as indicated by reference number 420. PCRF 126 may report the intercept subject's session establishment information (e.g., IRI) to DF 310, as indicated by reference number 425, and DF 310 may report the IRI to LEA CF 320 (not shown).

PCRF 126 may create a Credit-Control-Answer (CCA) message in response to the CCR message, and may provide the CCA message to PGW 128, as indicated by reference number 430. The CCA message may include a "LI-Indicator-Gx" AVP and a "LI-TargetDFAddr" AVP. The AVPs may indicate to PGW 128 that PGW 128 needs to intercept all packets to/from UE 102 and may provide an indication of where PGW 128 is to send the intercepted CC. PGW 128 may examine the AVPs of the CCA message, may install PCC rules included in the CCA message, and may setup CC intercept, as indicated by reference number 435. Since there is no Charging-Rule-Name included in the "LI-Indicator-Gx" AVP, PGW 128 may intercept all packets of the IP-CAN session (e.g., associated with UE 102), and may send the intercepted CC to DF 310, as specified in the "LI-TargetD- FAddr" AVP. PGW 128 may respond to a create default bearer request (e.g., provided by UE 102) with a create default bearer response, as indicated by reference number 440. The create default bearer response may indicate to UE 102 that a gate is now open for UE 102 to send and/or receive user data traffic. UE 102 may begin sending and/or receiving user data traffic, which passes through PGW 128, as indicated by reference number 445. PGW 128 may send a copy of UE 102's traffic to DF 310, as indicated by reference number 450, and DF 310 may forward the copy of the traffic to LEA CF 320 (not shown).

Although FIG. 4 shows exemplary components of network portion 400, in other implementations, network portion 400 may contain fewer, different, differently arranged, or additional components than depicted in FIG. 4. Additionally, or alternatively, one or more components of network portion 400 may perform one or more other tasks described as being performed by one or more other components of network portion 400. In one example, if UE 102 detaches from network portion 400, a similar call flow may occur. However, each step of such a call flow may request a tear down or removal instead of create or install.

Figure 5:
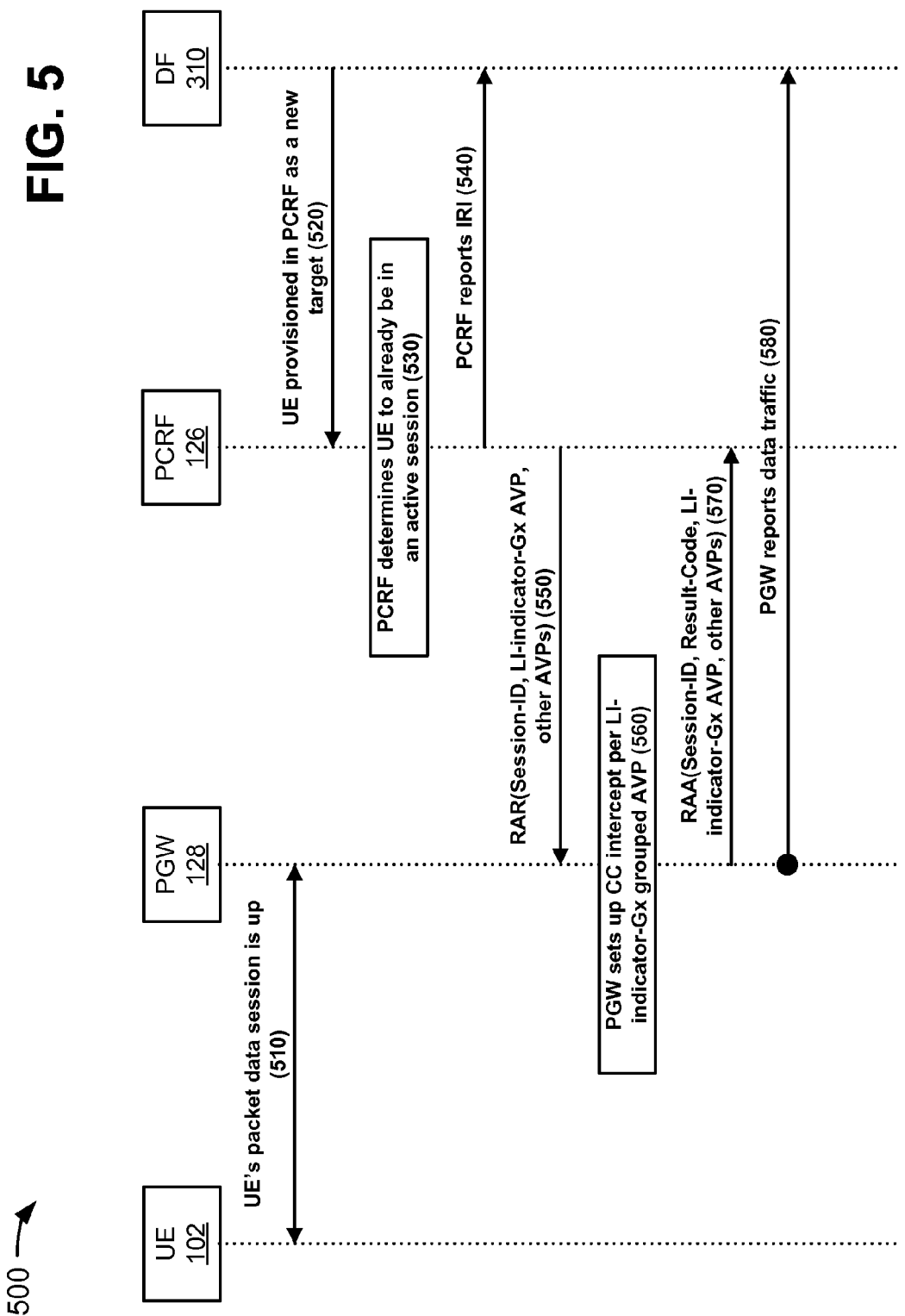
FIG. 5 is a diagram of an exemplary packet data lawful intercept in an exemplary portion of the network depicted in FIG. 1 and assuming that the user equipment is already attached to the network.

FIG. 5 is a diagram of an exemplary packet data lawful intercept in an exemplary portion 500 of network 100 and assuming that UE 102 is already attached to network portion 500 (e.g., when UE 102 is provisioned in PCRF 126 as a new intercept subject). As shown, exemplary network portion 500 may include UE 102, PCRF 126, PGW 128, and DF 310. UE 102 may include the features described above in connection with, for example, FIGS. 1 and 2. PCRF 126 and PGW 128 may include the features described above in connection with, for example, FIGS. 1-4. DF 310 may include the features described above in connection with, for example, FIGS. 3 and 4.

As further shown in FIG. 5, UE 102 may establish a packet data session via a default bearer setup, as indication by reference number 510. UE 102 may or may not be sending and/or receiving data traffic via the packet data session. If UE 102 becomes an intercept subject, PCRF 126 may receive an intercept request for UE 102 (e.g., as a new target) from DF 310, as indicated by reference number 520. PCRF 126 may check all established Gx sessions, and may locate an active Gx session corresponding to UE 102 (e.g., since UE 102 is already attached to network portion 500), as indicated by reference number 530. PCRF 126 may report all session information (e.g., IRI) associated with UE 102 (e.g., an IP address of UE 102, etc.) to DF 310, as indicated by reference number 540. DF 310 may report the IRI to LEA CF 320 (not shown).

PCRF 126 may send a RAR message (e.g., to PGW 128) that requests lawful intercept of UE 102's packet data session, as indicated by reference number 550. A detailed request may be specified in a "LI-Indicator-Gx" AVP included in the RAR message sent to PGW 128. PGW 128 may setup a CC intercept pursuant to the "LI-Indicator-Gx" AVP, as indicated by reference number 560. PGW 128 may send a RAA answer message (e.g., to PCRF 126) that acknowledges success, as indicated by reference number 570. PGW 128 may provide data traffic (e.g., associated with UE 102) to DF 310, as indicated by reference number 580. DF 310 may report the data traffic to LEA CF 320 (not shown).

Although FIG. 5 shows exemplary components of network portion 500, in other implementations, network portion 500 may contain fewer, different, differently arranged, or additional components than depicted in FIG. 5. Additionally, or alternatively, one or more components of network portion 500 may perform one or more other tasks described as being performed by one or more other components of network portion 500. In one example, if UE 102 ceases being an intercept subject while UE 102 is still attached to network portion 500, an intercept removal process may occur. A similar same call flow may be used for the intercept removal process. However, an intercept action provided in the "LI-Indicator-Gx" AVP may be set to "remove intercept."

In one exemplary implementation, IRI may be provided by S-CSCFs (e.g., S-CSCF 134) for SBA applications. S-CSCF 134 may include a complete list of intercept subject IDs, and may report all messages (e.g., per a standard). For a terminated call, S-CSCF 134 may check a SIP request URI (R-URI) provided in a SIP invite message. If the terminated call is initiated by an application server, S-CSCF 134 may also check a "P-Called-Party-ID" provided in the SIP invite message. If any of the headers contain a subject ID, S-CSCF 134 may report all SIP messages to DF 310. For an originated call, S-CSCF 134 may check for a subject ID in a "P-Asserted-ID" header and a "From" header of the SIP invite message. If any of the headers of the SIP invite message contain a subject ID (e.g., that matches one of SBA intercept subject IDs stored in S-CSCF 134), S-CSCF 134 may report all SIP messages to DF 310.

Figure 6:
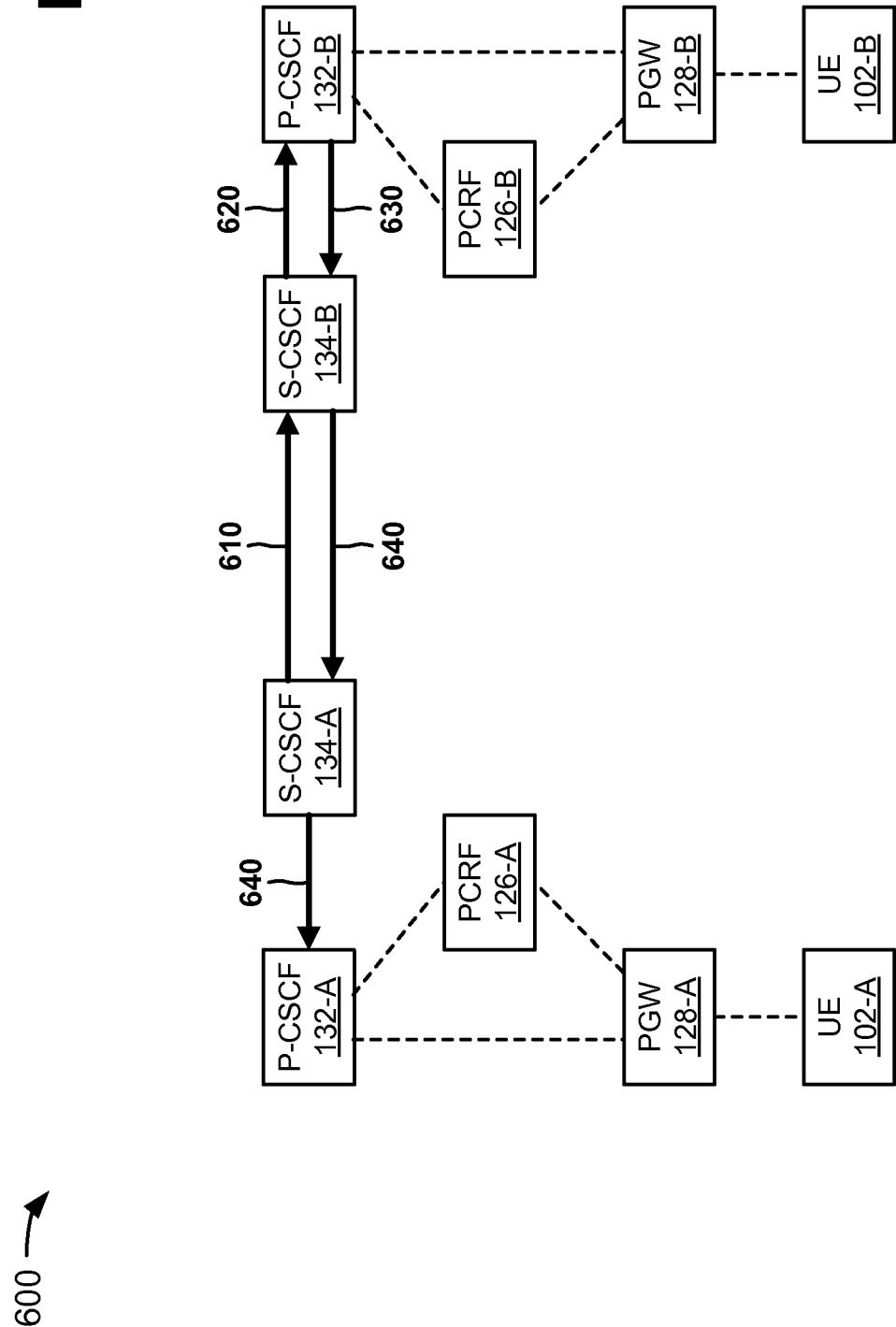
FIGS. 6 and 7 are diagrams of exemplary SIP-based lawful intercepts in exemplary portions of the network depicted in FIG. 1.
Figure 7:
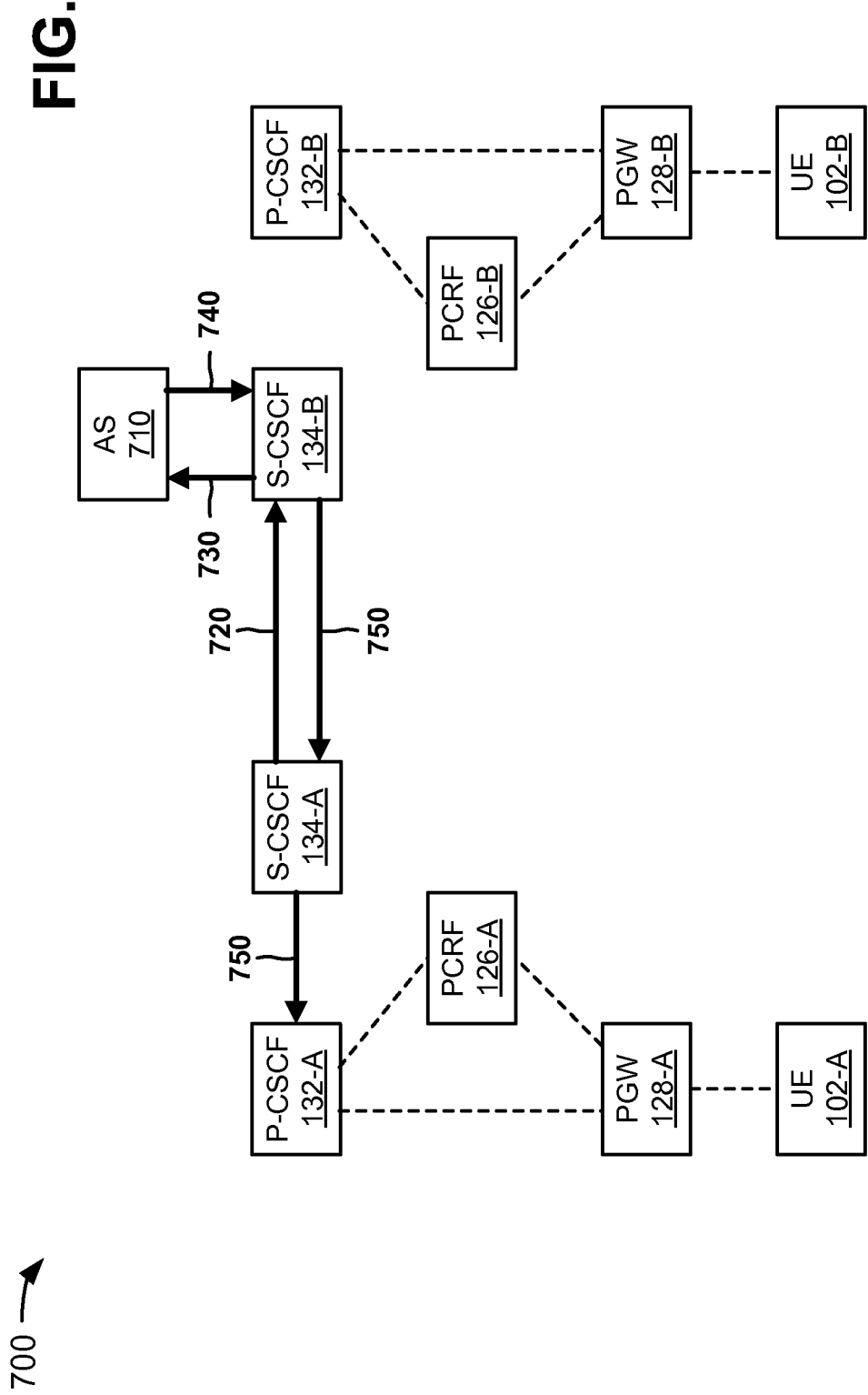

In another exemplary implementation, P-CSCF 132 may be a trigger point for CC intercept. FIGS. 6 and 7 may depict how P-CSCF 132 avoids duplicate intercept of CC by dynamically determining where to perform a CC intercept. FIGS. 6 and 7 are diagrams of exemplary SIP-based lawful intercepts in exemplary portions 600 and 700 of network 100. As shown in FIG. 6, exemplary network portion 600 may include UEs 102-A and 102-B, PCRFs 126-A and 126-B, PGWs 128-A and 128-B, P-CSCFs 132-A and 132-B, and S-CSCFs 134-A and 134-B. UEs 102-A and 120-B may include the features described above in connection with, for example, UE 102. PCRFs 126-A and 126-B may include the features described above in connection with, for example, PCRF 126. PGWs 128-A and 128-B may include the features described above in connection with, for example, PGW 128. P-CSCFs 132-A and 132-B may include the features described above in connection with, for example, P-CSCF 132. S-CSCFs 134-A and 134-B may include the features described above in connection with, for example, S-CSCF 134.

As further shown in FIG. 6, S-CSCF 134-A may provide a SIP invite message 610 to S-CSCF 134-B. SIP invite message 610 may include a "P-LI-Info" AVP with the following format: P-LI-Info={CorrelationID=ID, P-involved parties=A}. S-CSCF 134-B may receive SIP invite message 610, and may update the "P-LI-Info" AVP of SIP invite message 610 to create an updated SIP invite message 620. The updated "P-LI-Info" AVP may include the following format: P-LI-Info={CorrelationID=ID, P-involved parties=A,B}. In one example, if SIP invite message 610 is destined for an application server, S-CSCF 134-B may save a copy of the P-LI-Info header and then remove it from SIP invite message 610. S-CSCF 134-B may provide updated SIP invite message 620 to P-CSCF 132-B.

P-CSCF 132-B may save a copy of the P-LI-Info header and then remove the "P-LI-Info" AVP from updated SIP invite message 620, and may provide a SIP "200 OK" response message 630 to S-CSCF 134-B. SIP response message 630 may include a "P-LI-Info" AVP with the following format: P-LI-Info={CorrelationID=ID, intercept-capable=yes/no, P-involved parties=A,B}. The "P-LI-Info" AVP of SIP response message 630 may indicate that if any of the "P-involved parties" are an intercept subject (e.g., an intercept is enabled), the intercept may be started via PCRF 126-B. If intercept is not enabled, the "intercept-capable" may be marked as "no." S-CSCF 134-B may check if a "P-LI-Info" AVP is included in SIP response message 630. If a "P-LI-Info" AVP is included in SIP response message 630, S-CSCF 134-B may do nothing. If a "P-LI-Info" AVP is not included in SIP response message 630, S-CSCF 134-B may add a "P-LI-Info" AVP (e.g., with the following format: P-LI-Info={CorrelationID=ID, intercept-capable=no, P-involved parties=A,B}) to SIP response message 630 in order to create an updated SIP response message 640. S-CSCF 134-B may provide updated SIP response message 640 to S-CSCF 134-A.

S-CSCF 134-A may provide updated SIP response message 640 to P-CSCF 132-A. P-CSCF 132-A may check the "P-LI-Info" AVP included in updated SIP response message 640. If the "P-LI-Info" AVP indicates that "intercept-capable=yes," P-CSCF 132-A may do nothing. If the "P-LI-Info" AVP indicates that "intercept-capable=no," P-CSCF 132-A may begin the intercept (e.g., via PCRF 126-A and PGW 128-A) if "P-involved-parties" includes the intercept subject.

As shown in FIG. 7, exemplary network portion 700 may include the components of exemplary network portion 600, as well as an application server (AS) 710. Application server 710 may include one or more computation or communication devices that execute an application, such as a voice mail application. In one example, application server 710 may terminate or originate a call, but may not need to perform a lawful intercept. In FIG. 7, it may be assumed that a call from UE 102-A to UE 102-B may be redirected to application server 710.

S-CSCF 134-A may provide a SIP invite message 720 to S-CSCF 134-B. SIP invite message 720 may include a "P-LI-Info" AVP with the following format: P-LI-Info={CorrelationID=ID, P-involved parties=A}. S-CSCF 134-B may receive SIP invite message 720, and may update the "P-LI-Info" AVP of SIP invite message 720 to create an updated SIP invite message 730. The updated "P-LI-Info" AVP may include the following format: P-LI-Info={CorrelationID=ID, P-involved parties=A,B}. In one example, if SIP invite message 720 is destined for application server 710, S-CSCF 134-B may save a copy of the P-LI-Info header and remove it from SIP invite message 720. S-CSCF 134-B may then provide updated SIP invite message 730 to application server 710.

Application server 710 may receive updated SIP invite message 730, and may respond with a SIP "200 OK" response message 740. S-CSCF 134-B may check if a "P-LI-Info" AVP is included in SIP response message 740. If a "P-LI-Info" AVP is included in SIP response message 740, S-CSCF 134-B may do nothing. If a "P-LI-Info" AVP is not included in SIP response message 740, S-CSCF 134-B may add the saved "P-LI-Info" AVP (e.g., with the following format: P-LI-Info={CorrelationID=ID, intercept-capable=no, P-involved parties=A,B}) to SIP response message 740 in order to create an updated SIP response message 750. S-CSCF 134-B may provide updated SIP response message 750 to S-CSCF 134-A.

S-CSCF 134-A may provide updated SIP response message 750 to P-CSCF 132-A. P-CSCF 132-A may check the "P-LI-Info" AVP included in updated SIP response message 750. If the "P-LI-Info" AVP indicates that "intercept-capable=yes," P-CSCF 132-A may do nothing. If the "P-LI-Info" AVP indicates that "intercept-capable=no," P-CSCF 132-A may begin the intercept (e.g., via PCRF 126-A and PGW 128-A) if "P-involved-parties" includes the intercept subject.

Although FIGS. 6 and 7 show exemplary components of network portions 600 and 700, in other implementations, network portions 600 and/or 700 may contain fewer, different, differently arranged, or additional components than depicted in FIGS. 6 and 7. Additionally, or alternatively, one or more components of network portions 600 and/or 700 may perform one or more other tasks described as being performed by one or more other components of network portions 600 and/or 700.

Figure 8:
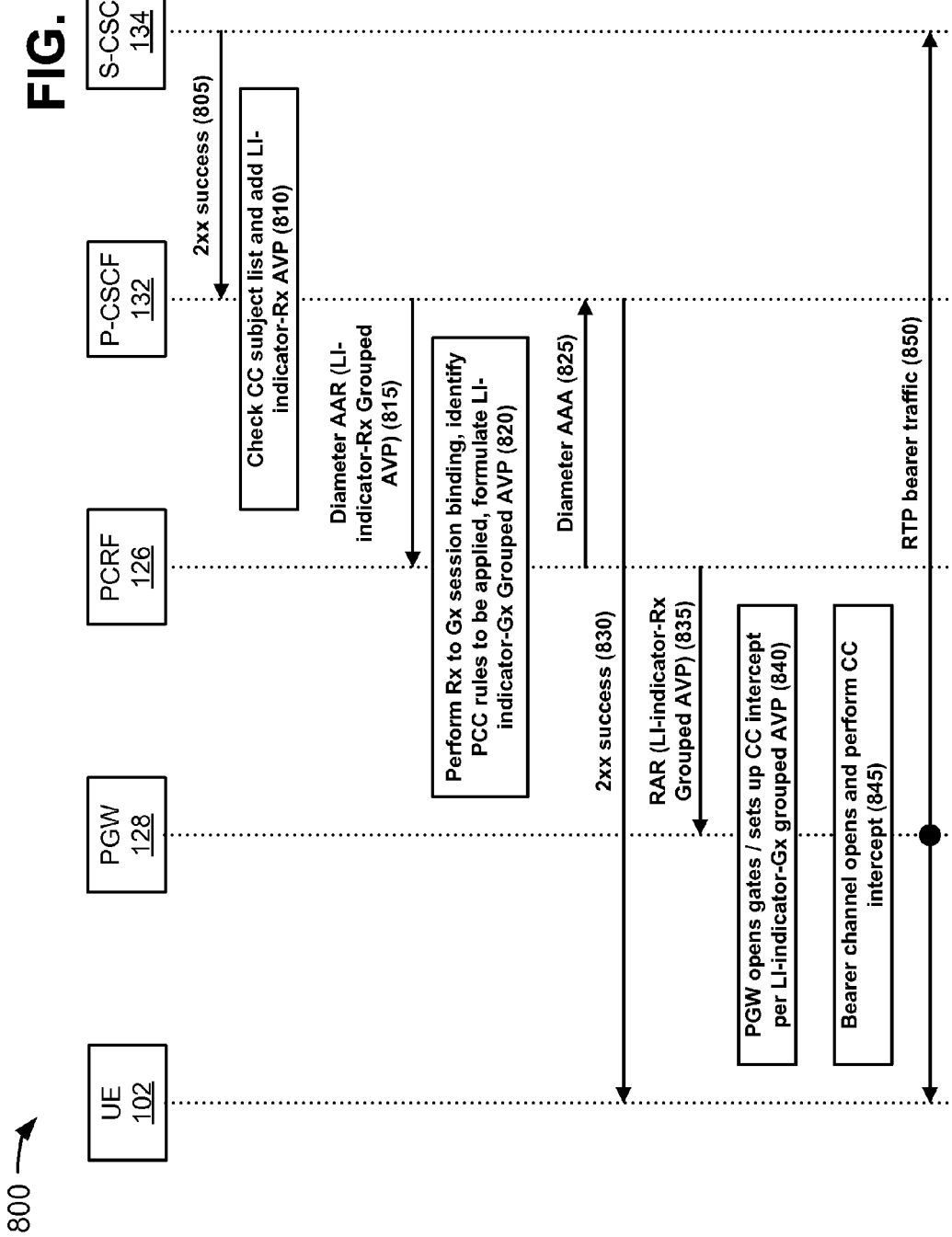
FIG. 8 is a diagram of another exemplary SIP-based lawful intercept in an exemplary portion of the network depicted in FIG. 1.

FIG. 8 is a diagram of another exemplary SIP-based lawful intercept in an exemplary portion 800 of network 100. As shown, exemplary network portion 800 may include UE 102, PCRF 126, PGW 128, P-CSCF 132, and S-CSCF 134. UE 102 may include the features described above in connection with, for example, FIGS. 1 and 2. PCRF 126, PGW 128, P-CSCF 132, and/or S-CSCF 134 may include the features described above in connection with, for example, FIGS. 1-7.

With reference to FIG. 8, UE 102 may be an intercept subject and may originate or terminate a call with another UE (not shown). SIP messages may be exchanged (e.g., between the UEs) to setup a bearer channel. One message, a SIP "2xx" success message, may be received by a P-CSCF (e.g., P-CSCF 132) serving UE 102, as indicated by reference number 805. The SIP "2xx" success message may contain agreed session description parameters (e.g., bearer configuration parameters including endpoint IP address, port number, etc.) that may be used by UE 102 and the other UE for bearer communication. When the "2xx" success message is received by P-CSCF 132, P-CSCF 132 may determine whether to perform a CC intercept (e.g., by checking a CC subject list and by adding a "LI-indicator-Rx" AVP to indicate whether to perform intercept), as indicated by reference number 810.

P-CSCF 132 may provide a Diameter AAR message to PCRF 126, as indicated in reference number 815. The AAR message may request that PCRF 126 open an Rx session with P-CSCF 132 to obtain authorization and request bearer resource allocation. P-CSCF 132 may include an encrypted "LI-Indicator-Rx" AVP (e.g., in the AAR message) that informs PGW 128 whether to intercept related call content. The "LI-Indicator-Rx" AVP may also include a random vector for AVP hiding, an intercept action, an IP address of DF 310, and a port to for sending the intercepted content, IRI, and a CC correlation-ID (e.g., for DF 310 to correlate IRI received from S-CSCF 134 with IRI received from PGW 128).

When PCRF 126 receives the AAR message from P-CSCF 132, PCRF 126 may perform a Rx to Gx session binding by using an IP address of UE 102, as indicated by reference number 820. When PCRF 126 determines the corresponding Gx session, PCRF 126 may know from which PGW (e.g., PGW 128) to perform a CC intercept. PCRF 126 may determine PCC rule(s) to be applied, and may formulate and encrypt a "LI-Indicator-Gx Grouped" AVP for inclusion in a RAR message, as indicated by reference number 820. The "LI-Indicator-Gx Grouped" AVP may include the information that was included in the "LI-indicator-Rx" AVP and a Charging-Rule-Name reference identifier of the PCC rules to be applied for the bearer session.

PCRF 126 may then send a Diameter AAA message to P-CSCF 132, as indicated by reference number 825. P-CSCF 132 may forward the "2xx" success message to UE 102, as indicated by reference number 830. PCRF 126 may send a Diameter RAR message over the identified Gx session to PGW 128 (e.g., so that PGW 128 may serve the bearer session), as indicated by reference number 835. PGW 128 may open gates, may install the included PCC rules, and may setup the "LI-Indicator-Gx Grouped" AVP, as indicated by reference number 840. For example, if an intercept-action provided in the AVP is an "add-intercept," PGW 128 may perform a CC intercept (e.g., based on the PCC rules indicated by the Charging-Rule-Names included in the "LI-Indicator-Gx" AVP), as indicated by reference number 845. PGW 128 may send the intercepted content (e.g., RTP bearer traffic) to DF 310 (not shown). DF 310 may send the intercepted content to LEA CF 320 (not shown).

Although FIG. 8 shows exemplary components of network portion 800, in other implementations, network portion 800 may contain fewer, different, differently arranged, or additional components than depicted in FIG. 8. Additionally, or alternatively, one or more components of network portion 800 may perform one or more other tasks described as being performed by one or more other components of network portion 800.

Figure 9:
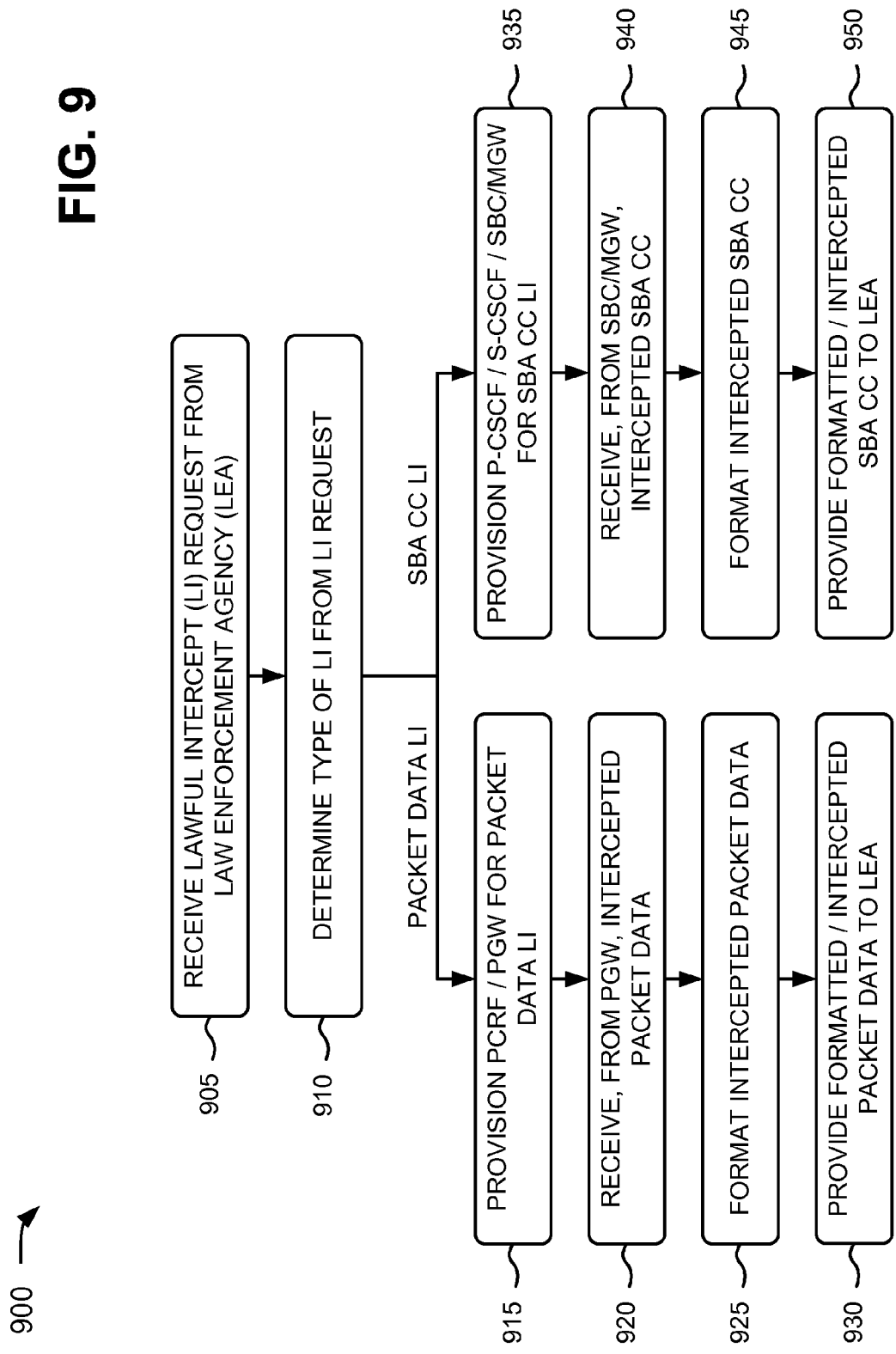
FIG. 9 is flow chart of an exemplary process for performing lawful intercept by a service provider's delivery function (DF)

FIG. 9 is flow chart of an exemplary process 900 for performing lawful intercept according to implementations described herein. In one implementation, process 900 may be performed by DF 310. In another implementation, some or all of process 900 may be performed by another device or group of devices, including or excluding DF 310.

As shown in FIG. 9, process 900 may include receiving a lawful intercept (LI) request from a law enforcement agency (LEA) (block 905), and determining a type of LI from the LI request (block 910). For example, in implementations described above in connection with FIG. 3, DF 310 may receive a lawful intercept (LI) request from one of LEA CFs 320 (e.g., LEA CF 320-1), and may determine a type of LI from the LI request. In one example, DF 310 may determine that a packet data LI is requested by the LI request or that a SBA LI is requested by the LI request.

As further shown in FIG. 9, when a packet data LI is requested (block 910—"PACKET DATA LI"), process 900 may include provisioning a PCRF and a PGW for packet data LI (block 915), receiving intercepted packet data from the PGW (block 920), formatting the intercepted packet data (block 925), and providing the formatted, intercepted packet data to the LEA (block 930). For example, in implementations described above in connection with FIG. 3, when a packet data LI is requested, DF 310 may provision PCRF 126 and PGW 128 for the packet data LI. DF 310 may receive intercepted packet data (e.g., intercepted from UE 102) from PGW 128. DF 310 may format the intercepted packet data received from PGW 128, and may provide the formatted, intercepted packet data to LEA CF 320-1.

Returning to FIG. 9, when a SBA LI is requested (block 910—"SBA LI"), process 900 may include provisioning a P-CSCF, a S-CSCF, and a SBC/MGW for SBA LI (block 935), receiving intercepted SBA CC from the SBC/MGW (block 940), formatting the intercepted SBA CC (block 945), and providing the intercepted SBA CC to the LEA (block 950). For example, in implementations described above in connection with FIG. 3, when a SBA LI is requested, DF 310 may provision P-CSCF 132, S-CSCF 134, and SBC/MGW 136 for the SBA LI. DF 310 may receive intercepted SBA CC (e.g., intercepted from UE 102) from SBC/MGW 136. DF 310 may format the intercepted SBA CC received from SBC/MGW 136, and may provide the formatted, intercepted SBA CC to LEA CD 320-1.

Figure 10:
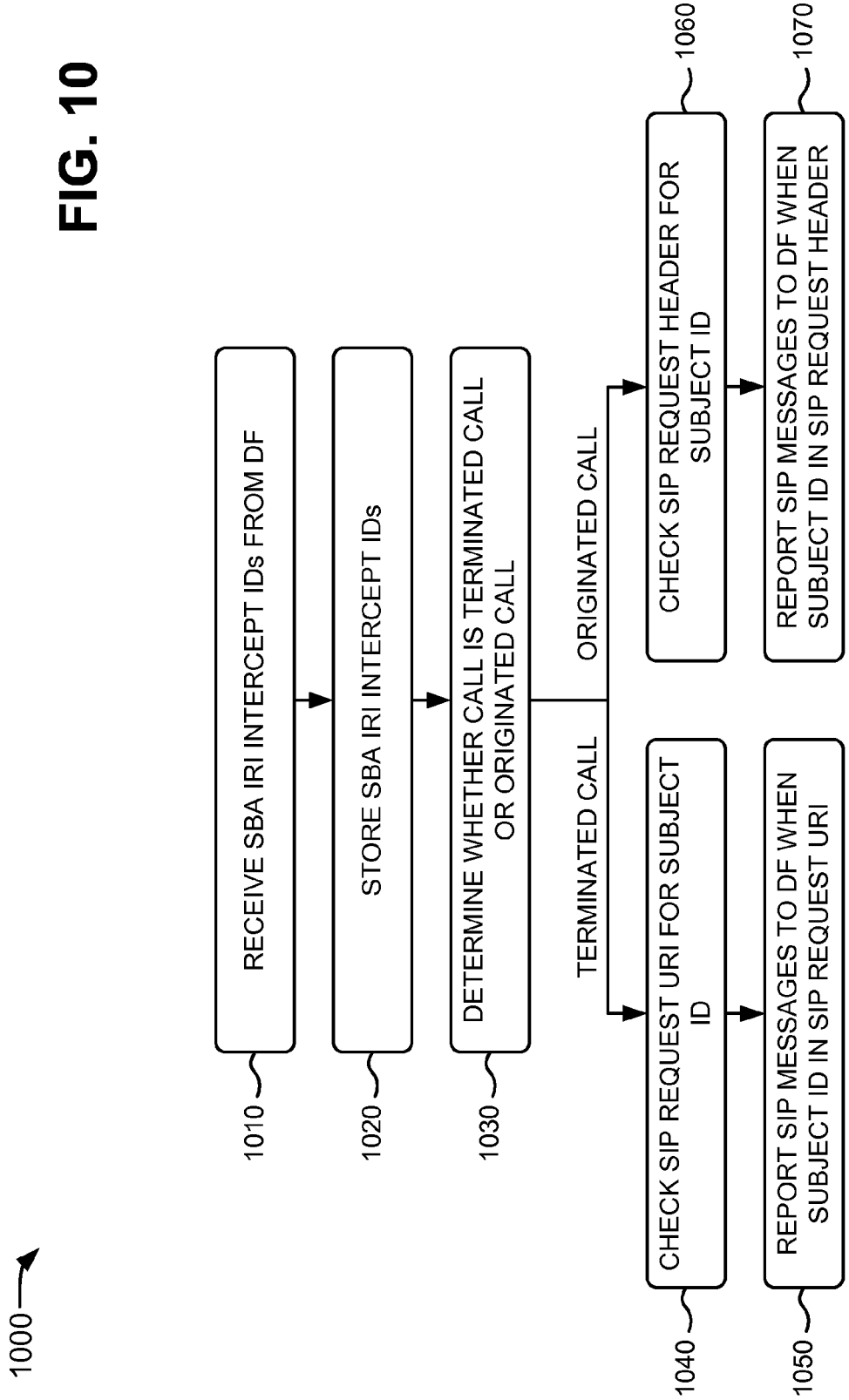
FIG. 10 is a flow chart of an exemplary process for performing lawful intercept by a serving call session control function (S-CSCF)

FIG. 10 is a flow chart of another exemplary process 1000 for performing lawful intercept according to implementations described herein. In one implementation, process 1000 may be performed by S-CSCF 134. In another implementation, some or all of process 1000 may be performed by another device or group of devices, including or excluding S-CSCF 134.

As shown in FIG. 10, process 1000 may include receiving SBA IRI intercept IDs from a DF (block 1010), and storing the SBA IRI intercept IDs (block 1020). For example, in implementations described above in connection with FIG. 3, S-CSCF 134 may be a IRI IAP for SBA intercepts, and may be a repository for SBA IRI intercept IDs. S-CSCF 134 may receive the SBA IRI intercept IDs from DF 310 (e.g., via X1 interface 350), and may store the SBA IRI intercept IDs.

As further shown in FIG. 10, process 1000 may include determining whether a call is a terminated call or an originated call (block 1030). If the call is a terminated call (block 1030—"TERMINATED CALL"), process 1000 may include checking a SIP request URI for a subject ID (block 1040) and reporting SIP messages to a DF when the subject ID is provided in the SIP request URI (block 1050). For example, in implementations described above in connection with FIG. 3, for a terminated call, S-CSCF 134 may check a SIP request URI (or R-URI) header in a SIP invite message associated with the terminated call. If the terminated call is initiated by an application server (not shown), S-CSCF 134 may check a "P-Called-Party-ID" header provided in the SIP invite message. If any of the headers of the SIP invite message contain a subject ID (e.g., that matches one of SBA IRI intercept IDs stored in S-CSCF 134), S-CSCF 134 may report all SIP messages to DF 310.

Returning to FIG. 10, if the call is an originated call (block 1030—"ORIGINATED CALL"), process 1000 may include checking a SIP request header for a subject ID (block 1060) and reporting SIP messages to the DF when the subject ID is provided in the SIP request header (block 1070). For example, in implementations described above in connection with FIG. 3, for an originated call, S-CSCF 134 may check for a subject ID in a "P-Asserted-ID" header and a "From" header of the SIP invite message. If any of the headers of the SIP invite message contain a subject ID (e.g., that matches one of SBA IRI intercept IDs stored in S-CSCF 134), S-CSCF 134 may report all SIP messages to DF 310. S-CSCF 134 may also update a "P-LI-Info" header that may be inserted in the SIP invite message by an originating S-CSCF 134. The "P-LI-Info" header may include instructions to pass a LI X2 and X3 correlation ID and to record involved parities when a call redirection occurs.

Figure 11:
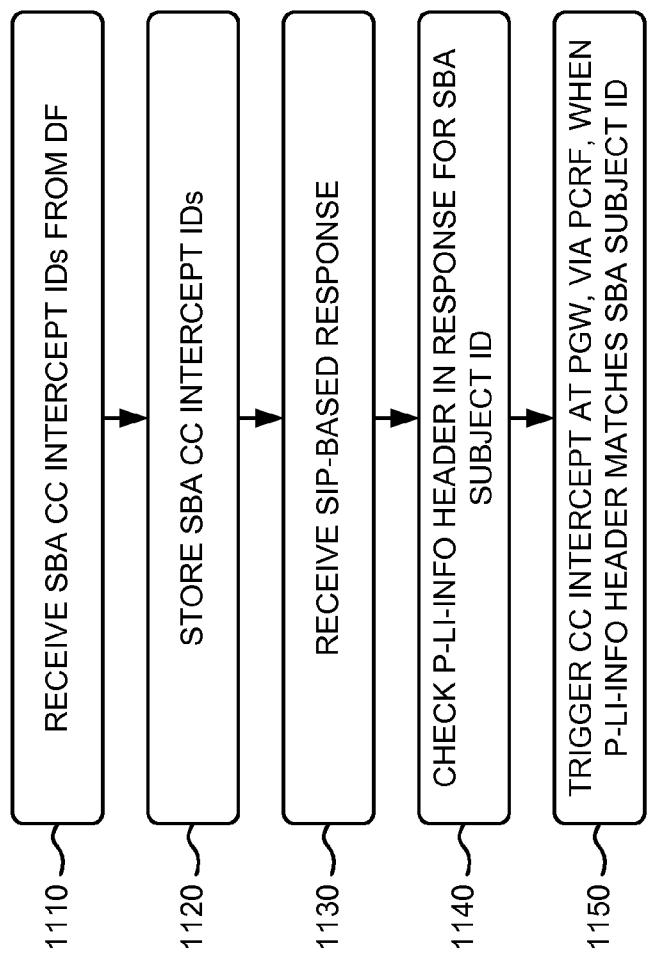
FIG. 11 is a flow chart of an exemplary process for performing lawful intercept by a proxy CSCF (P-CSCF)

FIG. 11 is a flow chart of still another exemplary process 1100 for performing lawful intercept according to implementations described herein. In one implementation, process 1100 may be performed by P-CSCF 132. In another implementation, some or all of process 1100 may be performed by another device or group of devices, including or excluding P-CSCF 132.

As shown in FIG. 11, process 1100 may include receiving SBA CC intercept IDs from a DF (block 1110), and storing the SBA CC intercept IDs (block 1120). For example, in implementations described above in connection with FIG. 3, P-CSCF 132 may be a repository of SBA CC intercept subject IDs. P-CSCF 132 may receive SBA CC intercept IDs from DF 310 (e.g., via X1 interface 350), and may store the SBA CC intercept IDs.

As further shown in FIG. 11, process 1100 may include receiving a SIP-based response message (block 1130), checking a "P-LI-Info" header provided in the response for a SBA subject ID (block 1140), and triggering a CC intercept at the PGW, via the PCRF, when the "P-LI-Info" header matches a SBA subject ID (block 1150). For example, in implementations described above in connection with FIG. 3, P-CSCF 132 may make a CC intercept determination by checking P-involved-parties in a "P-LI-Info" header associated with a SIP "183/200 OK" response message. If any of the headers of the SIP response message contain a SBA subject ID (e.g., that matches one of SBA CC intercept IDs stored in P-CSCF 132), P-CSCF 132 may determine that the CC of a session needs to be intercepted. P-CSCF 132 may trigger a CC intercept at PGW 128, via a "LI-Indicator-Rx" Attribute Value Pair (AVP) included in a Rx Diameter authentication authorization request (AAR) message provided to PCRF 126.

Figure 12:
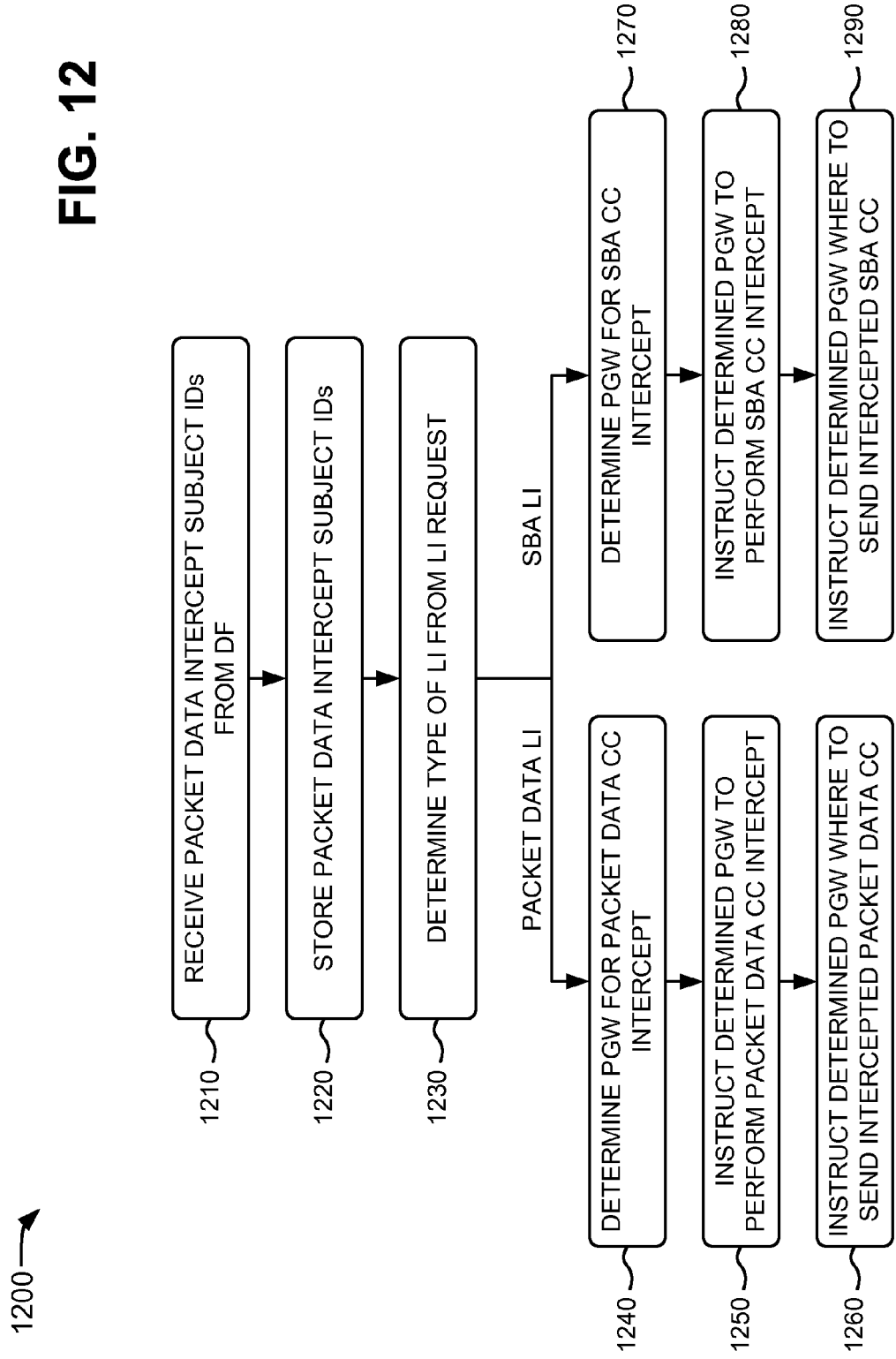
FIG. 12 is a flow chart of an exemplary process for performing lawful intercept by a policy control and charging rules function (PCRF).

FIG. 12 is a flow chart of a further exemplary process 1200 for performing lawful intercept according to implementations described herein. In one implementation, process 1200 may be performed by PCRF 126. In another implementation, some or all of process 1200 may be performed by another device or group of devices, including or excluding PCRF 126.

As shown in FIG. 12, process 1200 may include receiving packet data intercept IDs from a DF (block 1210), and storing the packet data intercept subject IDs (block 1220). For example, in implementations described above in connection with FIG. 3, for packet data intercept, PCRF 126 may be a repository for packet data intercept subject IDs. DF 310 may provide packet data intercept subject IDs (e.g., via X1 interface 350) to PCRF 126, and PCRF 126 may store the packet data intercept subject IDs.

As further shown in FIG. 12, process 1200 may include determining a type of LI from the LI request (block 1230). If the LI is a packet LI (block 1230—"PACKET DATA LI"), process 1200 may include determining a PGW for packet data CC intercept (block 1240), instructing the determined PGW to perform the packet data CC intercept (block 1250), and instructing the determined PGW where to send intercepted packet data CC (block 1260). For example, in implementations described above in connection with FIG. 3, PCRF 126 may locate a correct PGW (e.g., PGW 128) for CC intercept for both SBA intercept and packet data intercept. For packet data intercept, PCRF 126 may locate a correct PGW by comparing a provisioned subject ID with existing Gx session state information (e.g., stored in PCRF 126). Once PCRF 126 identifies a Gx session for either SBA intercept or packet data intercept, PCRF 126 may issue a Diameter RAR message. The RAR message may include a "LI-Indicator-Gx Grouped" AVP and a "LI-TargetDFAddr Group" AVP. The "LI-Indicator-Gx Grouped" AVP and the "LI-TargetDFAddr Group" AVP may instruct PGW 128 to perform a CC intercept and may provide PGW 128 information on where to send the intercepted CC.

Returning to FIG. 12, if the LI is a SBA LI (block 1230—"SBA LI"), process 1200 may include determining a PGW for SBA CC intercept (block 1270), instructing the determined PGW to perform the SBA CC intercept (block 1280), and instructing the determined PGW where to send intercepted SBA CC (block 1290). For example, in implementations described above in connection with FIG. 3, PCRF 126 may locate a correct PGW (e.g., PGW 128) for CC intercept for both SBA intercept and packet data intercept. For SBA intercept, PCRF 126 may locate a correct PGW via a Rx to Gx session binding process. Lawful intercept may piggyback on this function of PCRF 126 in order locate a correct PGW to intercept SBA applications. Once PCRF 126 identifies a Gx session for either SBA intercept or packet data intercept, PCRF 126 may issue a Diameter RAR message. The RAR message may include a "LI-Indicator-Gx Grouped" AVP and a "LI-TargetDFAddr Group" AVP. The "LI-Indicator-Gx Grouped" AVP and the "LI-TargetDFAddr Group" AVP may instruct PGW 128 to perform a CC intercept and may provide PGW 128 information on where to send the intercepted CC.

Implementations described herein may provide systems and/or methods that enable lawful intercept for IMS over EPC networks. In one exemplary implementation, the systems and/or methods may receive a LI request from a LEA, and may determine a type of LI from the request. When a packet data LI is requested, the systems and/or methods may provision a PCRF and a PGW for the packet data LI; may receive intercepted packet data from the PGW; may format the intercepted packet data; and may provide the formatted, intercepted packet data to the LEA. When a SBA LI is requested, the systems and/or methods may provision a P-CSCF, a S-CSCF, and a SBC/MGW for the SBA LI; may receive intercepted SBA CC from the SBC/MGW; may format the intercepted SBA CC; and may provide the formatted, intercepted SBA CC to the LEA.

The systems and/or methods described herein may provide an integrated approach towards intercepting SIP-based multimedia application and non-SIP based packet data applications. The systems and/or methods may dynamically locate and instruct CC IAPB for call/bearer content intercept for both SIP-based multimedia applications and non-SIP based applications. The systems and/or methods may provide intercept for all identifiable call scenarios without CC duplication, and may require fewer network elements to be CC IAPB (e.g., than current systems).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-12, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
  receiving, by a computing device, a lawful intercept request from a law enforcement agency;
  determining, by the computing device, a type of lawful intercept, of a plurality of types of lawful intercepts, based on the lawful intercept request,
    the plurality of types of lawful intercepts including:
      a packet data lawful intercept to intercept non-session initiation protocol (SIP)-based traffic associated with an intercept subject, and a SIP-based applications (SBA) lawful intercept to intercept traffic associated with one or more SIP multimedia sessions;

provisioning, by the computing device and when the determined type of lawful intercept is the packet data lawful intercept, a policy control and charging rules function (PCRF) and a packet data network (PDN) gateway (PGW), via the PCRF, for the packet data lawful intercept;

receiving, by the computing device and when the determined type of lawful intercept is the packet data lawful intercept, intercept related information (IRI) from the PCRF;

receiving, by the computing device and when the determined type of lawful intercept is the packet data lawful intercept, intercepted packet data from the PGW; and providing, by the computing device and when the determined type of lawful intercept is the packet data lawful intercept, the intercepted packet data and the IRI to the law enforcement agency.

2. The method of claim 1, where providing the intercepted packet data to the law enforcement agency includes:
formatting the intercepted packet data; and
providing the formatted, intercepted packet data to the law enforcement agency.

3. The method of claim 1, where, when the determined type of lawful intercept is the SBA lawful intercept, the method further includes:
provisioning a proxy call session control function (P-CSCF), a serving call session control function (S-CSCF), and a session border controller (SBC)/media gateway (MGW) for the SBA lawful intercept;
receiving intercepted SBA call content (CC) from the SBC/MGW;
receiving intercepted SBA IRI from the S-CSCF; and
providing the intercepted SBA CC and the intercepted SBA IRI to the law enforcement agency.

4. The method of claim 3, where providing the intercepted SBA CC and the intercepted SBA IRI to the law enforcement agency includes:
formatting the intercepted SBA CC and the intercepted SBA IRI; and
providing the formatted, intercepted SBA CC and the formatted, intercepted SBA IRI to the law enforcement agency.

5. The method of claim 1, where the computing device comprises a delivery function (DF) device.

6. A method comprising:
receiving, by an Internet protocol (IP) multimedia subsystem (IMS) network device, session initiation protocol (SIP)-based applications (SBA) intercept related information (IRI) intercept identifiers from a delivery function (DF);
determining, by the IMS network device, that a call is a terminated call;
checking, by the IMS network device and based on determining that the call is the terminated call, a SIP request uniform resource identifier (URI) header or a P-Called-Party-ID header, in a SIP invite message associated with the terminated call, for a subject identifier provided in the SBA IRI intercept identifiers; and
reporting, by the IMS network device, one or more session initiation protocol messages to the DF when the subject identifier is provided in the SIP request URI header or the P-Called-Party-ID header.

7. The method of claim 6, further comprising:
determining that another call is an originated call;

checking, based on determining that the other call is the originated call, a SIP request header, associated with the originated call, for another subject identifier; and
reporting one or more other SIP messages to the DF when the other subject identifier is provided in the SIP request header associated with the originated call.

8. The method of claim 6, where the IMS network device comprises a serving call session control function (S-CSCF) device.

9. The method of claim 6, further comprising:
receiving SBA call content (CC) intercept identifiers from the DF; and
storing the SBA CC intercept identifiers.

10. The method of claim 9, further comprising:
receiving a SIP response message;
determining whether a particular header in the SIP response message matches a SBA subject identifier provided in the stored SBA CC intercept identifiers; and
triggering CC intercept at a packet data network (PDN) gateway (PGW) when the particular header matches the SBA subject identifier.

11. The method of claim 10, where the IMS network device comprises a proxy call session control function (P-CSCF) device.

12. A method comprising:
receiving, by a computing device, packet data intercept subject identifiers from a delivery function;
determining, by the computing device, a type of lawful intercept, of a plurality of types of lawful intercepts, that is being requested by a lawful intercept request,
the plurality of types of lawful intercepts including:
a packet data lawful intercept to intercept non-session initiation protocol (SIP)-based traffic associated with an intercept subject, and
a SIP-based applications (SBA) lawful intercept to intercept traffic associated with one or more SIP multimedia sessions;
determining, via policy control and charging rules function (PCRF) associated with the computing device and when the determined type of lawful intercept is the packet data lawful intercept, a packet data network (PDN) gateway (PGW) for the packet data lawful intercept based on one of the packet data intercept subject identifiers;
instructing, via the PCRF associated with the computing device and when the determined type of lawful intercept is the packet data lawful intercept, the determined PGW to perform the packet data lawful intercept by intercepting packet data; and
instructing, by the computing device, the determined PGW where to send the intercepted packet data.

13. The method of claim 12, where, when the determined type of lawful intercept is the SBA lawful intercept, the method further includes:
determining another PGW for the SBA lawful intercept;
instructing the determined other PGW to perform the SBA lawful intercept by intercepting SBA traffic; and
instructing the determined other PGW where to send the intercepted SBA traffic.

14. The method of claim 12, where the computing device comprises a PCRF device.

15. A device comprising:
one or more processors to:
receive a lawful intercept request from a law enforcement agency,
determine a type of lawful intercept, of a plurality of types of lawful intercepts, based on the lawful intercept request, the plurality of types of lawful intercepts including:
   a packet data lawful intercept to intercept non-session initiation protocol (SIP)-based traffic associated with an intercept subject, and
   a SIP-based applications (SBA) lawful intercept to intercept traffic associated with one or more SIP multimedia sessions;
provision, when the determined type of lawful intercept is the packet data lawful intercept, a policy control and charging rules function (PCRF) and a packet data network (PDN) gateway (PGW) for the packet data lawful intercept,
receive intercepted packet data from the PGW, and
provide the intercepted packet data to the law enforcement agency.

16. The device of claim 15, where, when providing the intercepted packet data to the law enforcement agency, the one or more processors are to:
   format the intercepted packet data, and
   provide the formatted, intercepted packet data to the law enforcement agency.

17. The device of claim 15, where, when the determined type of lawful intercept is the SBA lawful intercept, the one or more processors are further to:
   provision a proxy call session control function (P-CSCF), a serving call session control function (S-CSCF), and a session border controller (SBC)/media gateway (MGW) for the SBA lawful intercept,
   receive intercepted SBA call content (CC) from the SBC/MGW, and
   provide the intercepted SBA CC to the law enforcement agency.

18. The device of claim 17, where, when providing the intercepted packet SBA CC to the law enforcement agency, the one or more processors are to:
   format the intercepted SBA CC, and
   provide the formatted, intercepted SBA CC to the law enforcement agency.

19. A device comprising:
one or more processors to:
   receive, from a delivery function, session initiation protocol (SIP)-based applications (SBA) intercept related information (IRI) intercept identifiers,
   receive a call,
   determine that the call is a terminated call,
   check, based on determining that the call is the terminated call, a SIP request uniform resource identifier (URI) header or a P-Called-Party-ID header, in a SIP invite message associated with the terminated call, for a subject identifier provided in the SBA IRI intercept identifiers, and
   report, to the delivery function, one or more SIP messages when the subject identifier is provided in the SIP request URI header or the P-Called-Party-ID header.

20. The device of claim 19, where the one or more processors are further to:
   determine that another call is an originated call,
   check, based on determining that the other call is the originated call, another SIP request header, associated with the originated call, for another subject identifier, and
   report, to the delivery function, one or more other SIP messages when the other subject identifier is provided in the SIP request header associated with the originated call.

21. The device of claim 19, where the one or more processors are further to:
   receive SBA call content (CC) intercept identifiers from the delivery function, and
   store the SBA CC intercept identifiers in a memory.

22. The device of claim 21, where the one or more processors are further to:
   receive a SIP response message,
   determine whether a particular header in the SIP response message matches a SBA subject identifier provided in the stored SBA CC intercept identifiers, and
   trigger, via a policy control and charging rules function (PCRF) and when the particular header matches the SBA subject identifier, CC intercept at a packet data network (PDN) gateway (PGW).

23. A device comprising:
one or more processors to:
   receive packet data intercept subject identifiers from a delivery function,
   determine a type of lawful intercept, of a plurality of types of lawful intercepts, that is being requested by a lawful intercept request,
      the plurality of types of lawful intercepts including:
         a packet data lawful intercept to intercept non-session initiation protocol (SIP)-based traffic associated with an intercept subject, and
         a SIP-based applications (SBA) lawful intercept to intercept traffic associated with one or more SIP multimedia sessions;
   determine, via a policy control and charging rules function (PCRF) and when the determined type of lawful intercept is the packet data lawful intercept, a packet data network (PDN) gateway (PGW) for the packet data lawful intercept,
   instruct, via the PCRF and when the determined type of lawful intercept is the packet data lawful intercept, the determined PGW to perform the packet data lawful intercept by intercepting packet data, and
   instruct, when the determined type of lawful intercept is the packet data lawful intercept, the determined PGW where to send the intercepted packet data.

24. The device claim 23, where, when the determined type of lawful intercept is the SBA lawful intercept, the one or more processors are further to:
   determine, via the PCRF, another PGW for the SBA lawful intercept,
   instruct, via the PCRF, the determined other PGW to perform the SBA lawful intercept, and
   instruct, via the PCRF, the determined other PGW where to send the intercepted SBA.

* * * * *